US010234317B2

(12) United States Patent
Wohlgenannt

(10) Patent No.: US 10,234,317 B2
(45) Date of Patent: Mar. 19, 2019

(54) METERING DEVICE FOR LIQUID SUPPLY WITH CONNECTOR

(71) Applicant: CAPARTIS AG, Schaffhausen (CH)

(72) Inventor: Herbert Wohlgenannt, Schaffhausen (CH)

(73) Assignee: CAPARTIS AG, Schaffhausen (CH)

(*) Notice: Subject to any disclaimer, the term of this patent is extended or adjusted under 35 U.S.C. 154(b) by 1 day.

(21) Appl. No.: 15/129,887

(22) PCT Filed: Mar. 27, 2015

(86) PCT No.: PCT/EP2015/056690
§ 371 (c)(1),
(2) Date: Sep. 28, 2016

(87) PCT Pub. No.: WO2015/150250
PCT Pub. Date: Oct. 8, 2015

(65) Prior Publication Data
US 2017/0176231 A1 Jun. 22, 2017

(30) Foreign Application Priority Data
Mar. 31, 2014 (CH) .................................. 00486/14

(51) Int. Cl.
B65D 25/52 (2006.01)
B65D 41/26 (2006.01)
(Continued)

(52) U.S. Cl.
CPC .............. *G01F 11/04* (2013.01); *B65D 25/52* (2013.01); *B65D 41/26* (2013.01); *B65D 83/54* (2013.01); *G01F 11/021* (2013.01); *G01F 11/268* (2013.01)

(58) Field of Classification Search
CPC ....... G01F 11/04; G01F 11/021; G01F 11/263
(Continued)

(56) References Cited

U.S. PATENT DOCUMENTS 2,864,538 A * 12/1958 Rasmussen ............. G01F 11/12
222/307
4,830,226 A * 5/1989 Kong .................... B67D 7/0216
222/205

(Continued)

FOREIGN PATENT DOCUMENTS

EP          0337778 A2 * 10/1989 ............ G01F 11/263

*Primary Examiner* — Jeremy Carroll
(74) *Attorney, Agent, or Firm* — Steven M. Shape; Dennemeyer & Associates

(57) ABSTRACT

The dosing device consists, for example, of a closure, having a closure body (1) with sealing closing means (7), which can be placed in a sealing manner on the connector. The metering means of the closure consist of just two components. There is first, seated securely in the closure body (1), a hollow cup (4) having, on the bottom side of the cup (4), a window (12) arranged in its side wall. The second component is a cap-shaped metering piston (10) having, on the upper side of the cap, a projection (5) which extends in the axial direction. This metering piston (10) with projection (5) fits into the cup (4), wherein its projection (5) covers and closes the window (12). The metering piston (10) is able to move axially in the cup (4) and its projection (5) is able to pivot to a limited degree toward the outer side of the window (12). In the pivoted-out state, it forms, together with the cup (4), an open valve which is otherwise closed.

17 Claims, 20 Drawing Sheets

(51) Int. Cl.
*B65D 83/54* (2006.01)
*G01F 11/26* (2006.01)
*G01F 11/04* (2006.01)
*G01F 11/02* (2006.01)

(58) Field of Classification Search
USPC .......................................................... 222/207
See application file for complete search history.

(56) References Cited

U.S. PATENT DOCUMENTS 5,044,527 A * 9/1991 Hickerson ............. G01F 11/263
222/451
6,276,572 B1 * 8/2001 Evans .................... B65D 1/023
222/424.5

* cited by examiner

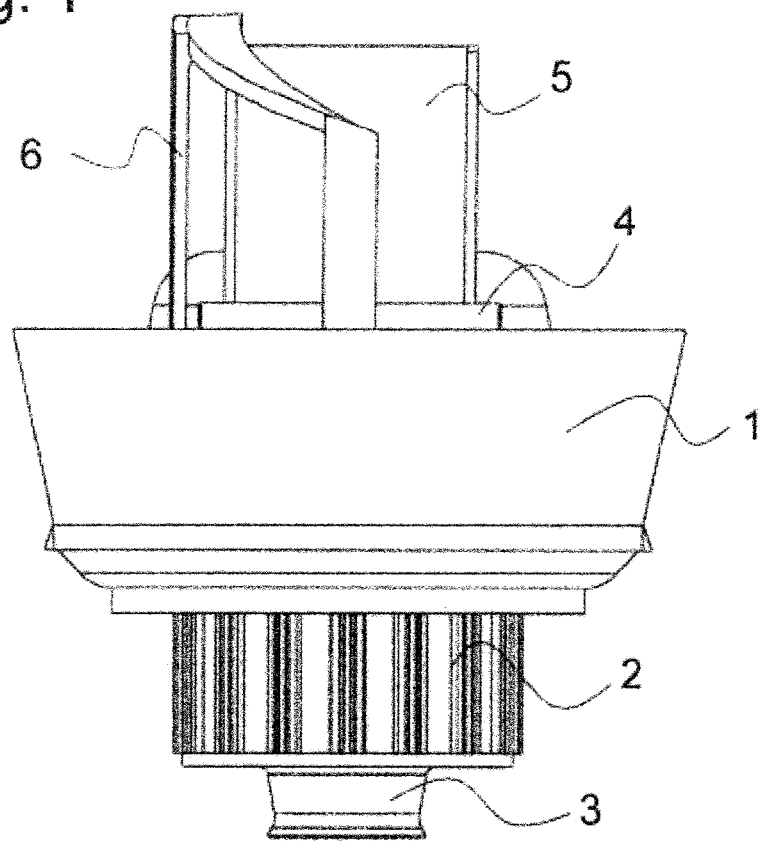

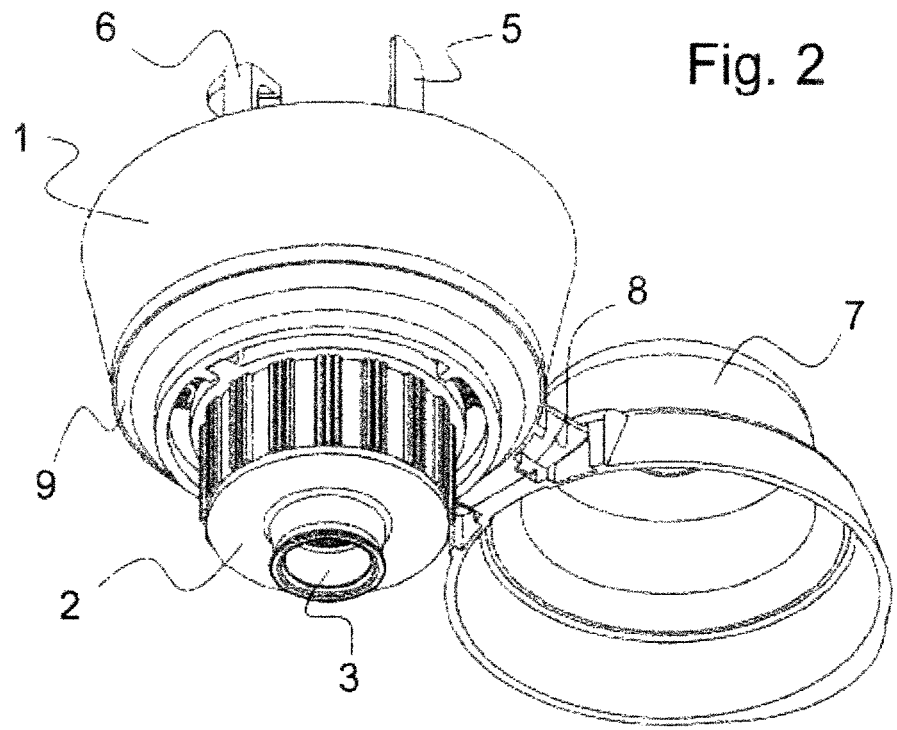
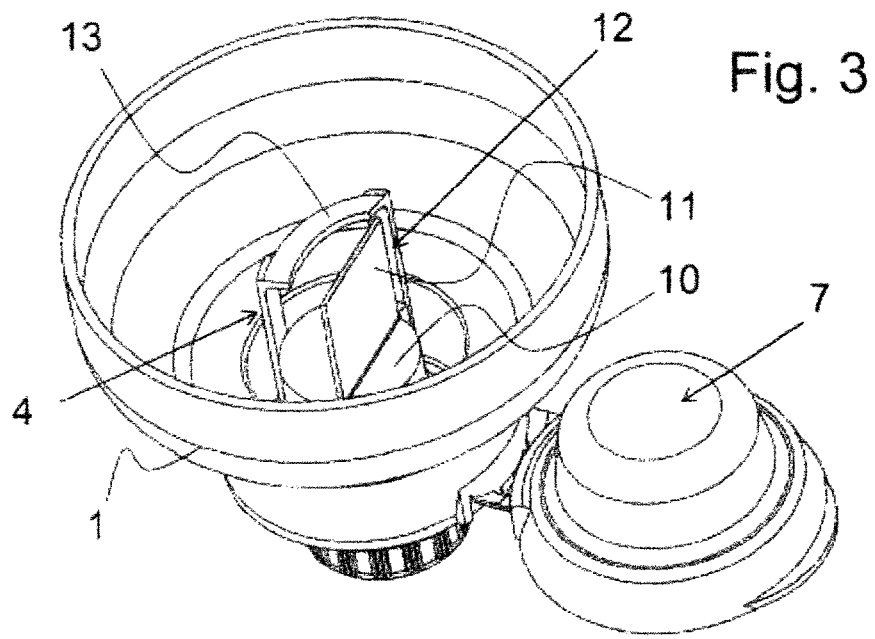

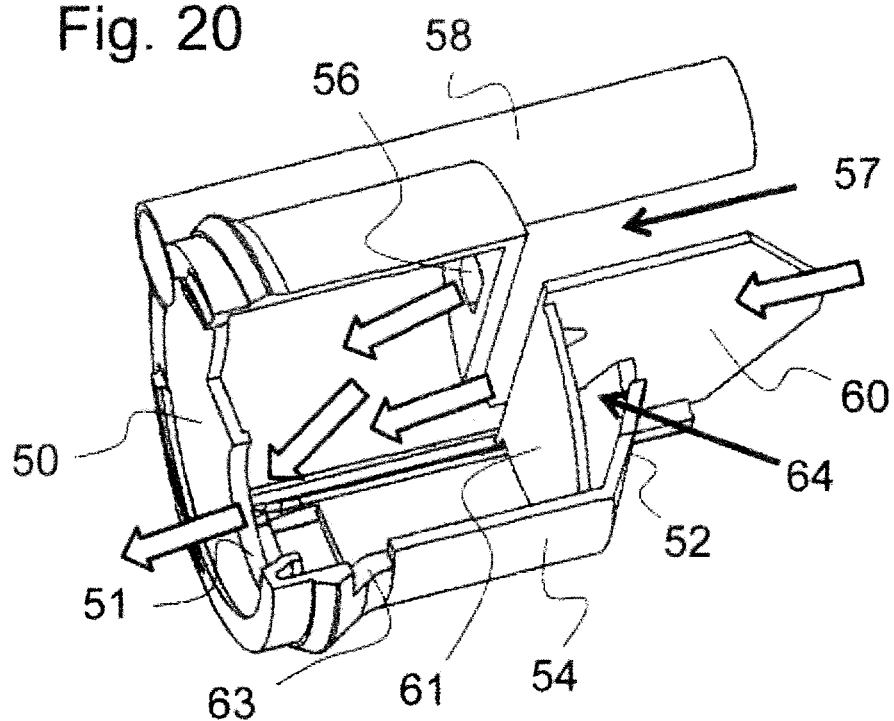
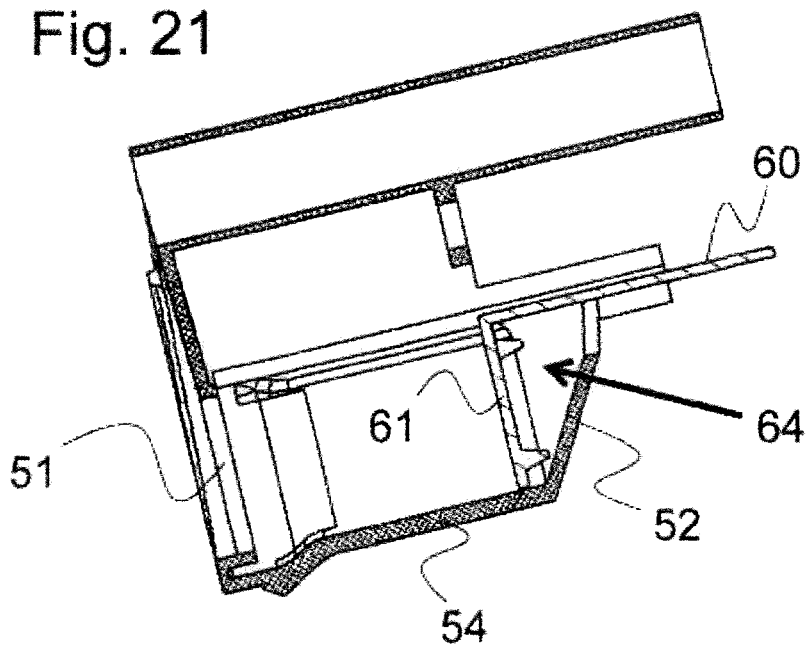

METERING DEVICE FOR LIQUID SUPPLY WITH CONNECTOR

The invention relates to a dosing device to pour a liquid supply in dosed portions, either from a container with a spout, for example, a bottle made of a plastic or PET, or from a hose with a spout.

Dosing closures or devices for dosed pouring of liquids are known in several designs, for example from WO 2005/049477 and EP 2 653 842. Previously known dosing closures or dosing devices are, however, consistently made of several parts, and comprise at least three, even far more, parts. In addition, certain parts, such as closure devices in the form of balls and ball bearings, are challenging to manufacture, and the items are expensive to assemble, i.e. in their assembly to form a complete dosing closure. A dosing device is known from U.S. Pat. No. 2,864,538, wherein it may be placed on a spout of a container. It projects axially away from the spout to form, for example, a cylindrical or drum-shaped dosing chamber of substantially greater diameter than the container spout. This dosing chamber may be displaced axially in two end positions. When the container is inverted so that the spout lies downwards, the dosing chamber is pushed upwards to its stop and is then filled. The dosing chamber is pushed downwards to a lower stop in order to empty it, following which the content held therein may be poured out. In one variant, the dose may be varied by the dosing device being rotated more or less strongly to alter the degree of filling of the dosing chamber. However, this dosing device cannot be integrated in a container spout or head or inside the container, but is always attached outside to the spout. Moreover, the following dosing requires additional manipulations that cannot be performed with one hand. The container needs to be tipped upside down and the dosing chamber then has to be pushed down, wherein the dose flows out. So both hands are inevitably needed for the dosed pouring.

DE 3 221 438 discloses a device for extracting a certain amount of liquid from a container. It has a piston slidably mounted in a cylinder, wherein the cylinder is connected at one end to a closure block mounted on the container opening. The closure block has an inlet port with an inlet closure, as well as an outlet port with an outlet closure. The piston is axially limited, wherein one stop is movable and is step-shaped and extends along a helical curve that is coaxial to the cylinder. One of the stops is adjustable in the circumferential direction of the cylinder. Depending on the mutual angular position of the stops, the piston may move more or less in its path, and correspondingly suck more or less liquid and then output it. The dosing system consists of ball closures for the inlet and outlet and is also composed of a plurality of individual parts, particularly of several small parts. This requires very complicated installation and, overall, this closure solution is wholly unsuited for e.g. a pourable liquid detergent.

In view of this prior art, the object of the present invention is to provide a dosing device for a liquid feed from a container or hose with spouts for liquid contents of thick to thin liquidity, which requires only a minimal number of parts, is very easy to assemble, and that is foolproof in application, does not clog, and allows reliable dosing by simply tilting it into a pouring position, or through inversion and slight squeezing of the container or bellows of a hose from which the liquid is supplied. In a particular embodiment, the dosage should be infinitely adjustable between a minimum and a maximum, and should allow continuous pouring out in a further adjustment position.

This object is achieved by a dosing device for a spout for dispensing defined doses from a container or tube, consisting of a screw-on or pushable spout attachment having a closure body that is optionally sealable with a separate cover, and which comprises a variable-volume dosing control chamber, which is filled from empty to full upon pouring, wherein the dosing control chamber is limited by two stationary and two movable walls, wherein the closure body has two mutually-parallel arbitrarily-shaped sidewalls extending axially to the spout, one of which is displaceable relative to the other in the axial direction towards the spout on the closure body, and wherein the stationary sidewall at the closure body forms a bottom wall on its side facing the container at an angle to the movable side wall, wherein the movable side wall at its end facing the spout of the container Balms a projecting top wall at an angle, which connects to the stationary side wall, wherein all four walls form the variable-volume dosing control chamber, and wherein the pouring hole is sealingly covered by the top wall all the way to the mouth of the container spout in the extended position of the movable sidewalls.

Various embodiments of this dosing device and its components are described below with reference to the drawings and the function of these parts and the operation of these dosing devices are explained and discussed in detail:

FIG. 1 shows the dosing device in the inverted pouring position, with closing means;

FIG. 2 shows a similar dosing device in the inverted pouring position, represented obliquely from below in perspective, with the closing means pivoted through 180°;

FIG. 3 shows this dosing device in the inverted pouring position, represented obliquely from above in perspective;

FIG. 20 shows the closure body with the dosing control chamber of the dosing device of FIG. 19 in the pouring position, shown partially cut away;

FIG. 21 shows the closure body of FIG. 20 in a section along the cylinder axis of the closure body;

Figure 4:
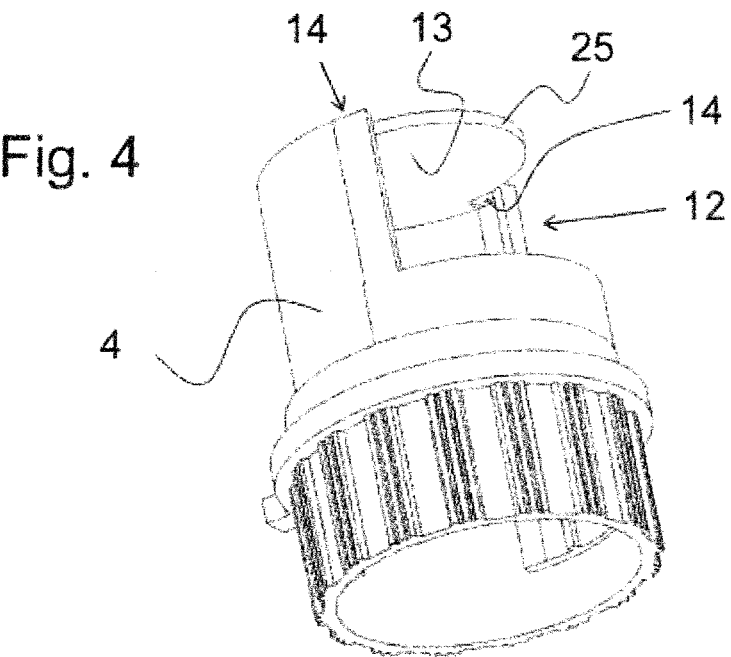
FIG. 4 shows the first stationary part of the dosing means, namely the cup with window.

FIG. 1 shows the dosing device, as a dosing closure in the example shown, in the inverted pouring position. With closing means, which may be in the form of a cap which is hinged to be swung onto the closure spout 3, and latched or snapped or screwed onto it. This dosing device, or in this case dosing closure, with its closure body 1, may be screwed, latched, or sealingly snapped or pushed onto the spout of a container or hose. In order that the closure body 1 may be sealingly fastened on a spout, it may be provided, for example, with an internal thread, which fits in a corresponding external thread of the spout. On the other hand, the spout may comprise an internal thread, and then the closure body is equipped with a tubular extension extending in the spout, which then comprises a corresponding external thread. Alternatively, the closure body may be pushed over an outer edge onto an otherwise smooth bottle, container or hose end by means of an inner circumferential bead. Pushing with a rubber gasket or snapping on with a latch is also conceivable. Effectively, the closure body 1 has to be simply sealingly secured on a spout of the container or tube—no matter how. In the drawing, a knurled rotating body 2 extends outwards below the closure body 1, which is rotatably inserted inside the closure body 1 by a certain amount around the closure axis. However, this is already an option, as will become clear later.

In a simplest embodiment, the dosing device or dosing closure does not comprise such a rotating body and thus simply fits firmly in the closure body, or may form an integral part of it, and thus there is no longer a rotating body. Right at the bottom, may be seen the spout 3 of the dosing closure out of whose centric hole the dosed liquid exits. The two components of the dosing means may be identified above the closure body 1, namely the upper end of a stationary cup 4 with the window that is not visible here, as well as the extension 5, which belongs to a movable dosing piston. This extension 5 forms an extension of the cylindrical wall over an angular segment of 90° to 200°. Finally, an upper helix-shaped limiter 6 may be seen in this view, whose significance and function will become clear in the further course of the description.

FIG. 2 shows this dosing closure in an inverted pouring position from diagonally underneath in perspective. The closing means here is in the form of a cap 7, which is pivotable with respect to the rotary body 2 and spout 3 about a film hinge 8 on the closure body 1, and which closes the spout 3 by snapping onto the edge 9 of the closure body 1. At the top may be seen the limiter 6 and the extension 5 on the dosing piston, which have been mentioned in the description of FIG. 1.

FIG. 3 shows this dosing closure in the inverted pouring position from diagonally above in perspective. In this view may be seen the two components of the dosing means, namely, in the example illustrated, the movable dosing piston 10 with its planar upwardly-extending extension 11, as well as the top of a hollow cylindrical cup 4 with a window 12, which extends over a whole lateral half of the cup 4. These parts are described in detail below with reference to the other figures and their function explained.

FIG. 4 shows the first stationary part of the dosing means, namely the hollow cylindrical cup 4 with window 12. In essence, it is merely a hollow cylinder, which is closed at the top by a cover 13, wherein this cover 13 is planar in the example illustrated, but may also have a shape other than planar. The window 12 is recessed in the peripheral wall at the upper end and extends here over half of the circumference. The cover 13 is reduced in radius at its edge in the outer peripheral region which extends along the upper window edge by the wall thickness of the circumferential wall. Its outer slightly inwardly-offset edge 25 extends on both sides over something like more than half the circumference, so that slits 14 are formed in the cover 13 on both sides of the window 12. On its inside, guide ribs are formed in the hollow cylinder of the cup 4, and extend in the axial direction.

Figure 5:
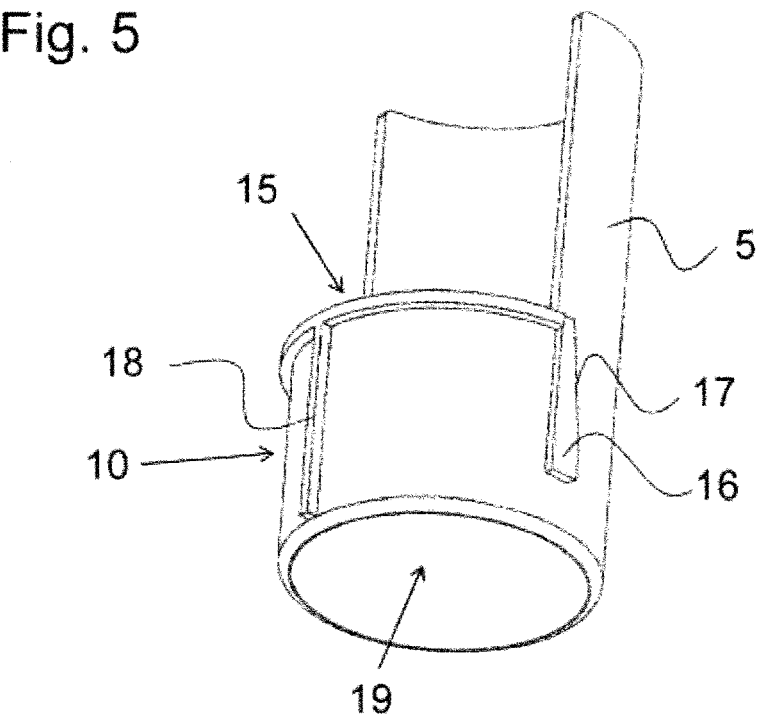
FIG. 5 shows the second movable part of the dosing, namely the dosing piston with extension.

The second movable component of the dosing means, namely a dosing piston 10 with an extension 5 as shown in FIG. 5, may be inserted in the hollow cylindrical cup of FIG.

4. This dosing piston 10 is in the form, as it were, of a chair, which is covered with a slipcover. It forms a downwardly-open hollow cylinder 19 at the bottom, while its outer wall extends above the upper end surface 15 of the hollow cylinder 19 to form an extension 5 in the form of a detached segment of a peripheral wall. This extension 5 extends here over half the circumference of the hollow cylinder 19 or dosing piston 10. It may also extend over an angular segment of 90° to 200° in the axial direction to the dosing piston 10. Remaining with the comparison with an illustrative chair, this extension 5 thus forms to some extent the back of the chair. Outside on the dosing piston 10 may be found on both sides a wedge-shaped rib 16 with an inclined surface 17, which therefore runs slightly obliquely to the axial direction of the hollow cylinder and the dosing piston 10. In the example shown, there is also an axial rib 18 in front of the cup, or the front of the "chair" formed in front of it.

Figure 6:
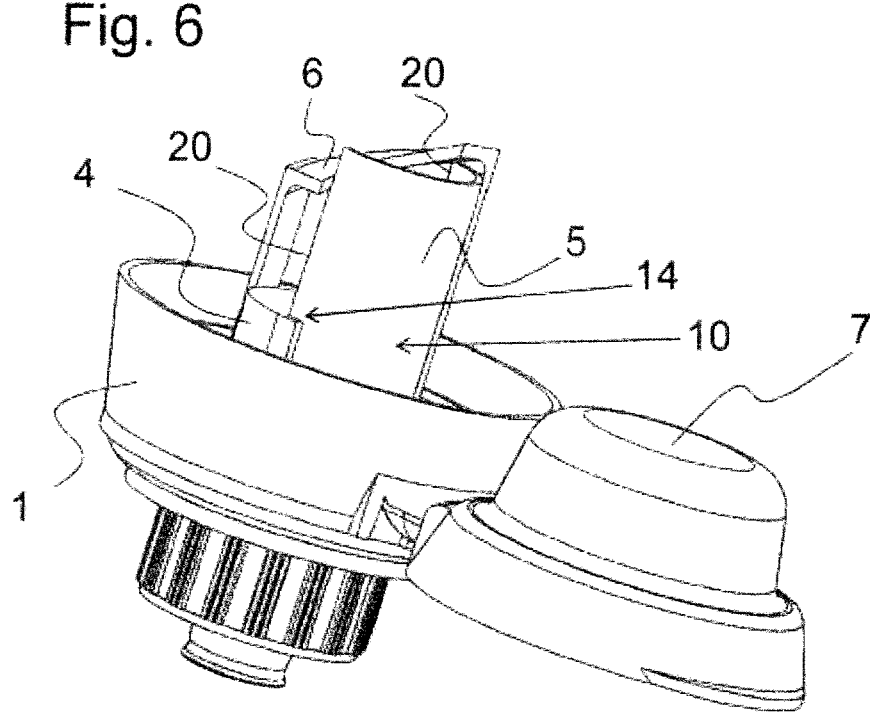
FIG. 6 shows the dosing means in the device, with the dosing piston in its uppermost position in the cup.

FIG. 6 shows the dosing means inserted in the dosing device or, here, in the dosing closure, with the dosing piston 10 with its extension 5 in its uppermost position within the cup 4. As may be seen, the extension 5 fits with its lateral edges 20 in the slits 14 on the cover 13 of the cup 4. Thus, the dosing piston 10 may move inside the cup 4 in the axial direction, and, because of the dimensions of the parts a clearance is formed allowing the dosing piston 10 also to tilt slightly to one side inside the cup relative to the axis of the cup 4, so that the axis of rotation of the dosing piston 10 no longer runs exactly parallel to that of the hollow-cylindrical cup 4. This geometry proves to be crucial for the dosing function as will be explained in detail later. Finally, the helix-shaped limiter 6 may be seen in FIG. 6, which is, however, of no importance for the basic dosing function, but offers an option in the event that the dosing amount has to be regulated to a certain extent, which is also explained in more detail below when the dosing function is described and explained step by step.

Figure 7:
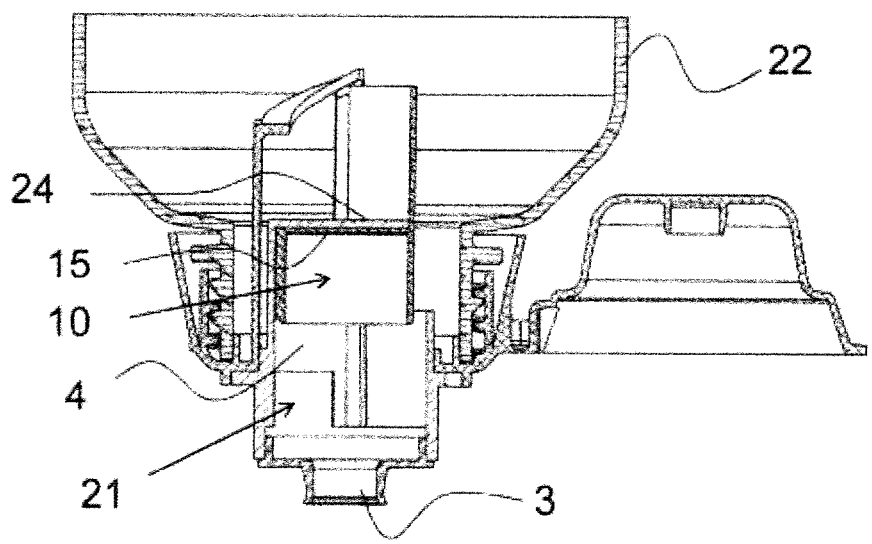
FIG. 7 shows the dosing device in an axial section, with the dosing piston in its uppermost position in the cup, ready to dispense a dosing portion.

FIG. 7 shows the dosing device or the dosing closure in an axial section, with the dosing piston 10 in its uppermost position inside the cup 4 and ready to dispense a dosing portion. In this position, the chamber 21 under the dosing piston 10 has been filled with liquid from the container 22, which is fitted with the dosing closure. However, this liquid may not flow out, because no air is able to flow through the spout 3 from below. This is because the dosing chamber is almost sealed, which means the dosing piston 10 is effectively sealed in the uppermost position with respect to the cup 4, wherein its extension 5 pushes in front of the window 12 in the cup 4. This geometry as well as the viscosity prevent ingress of air and hence a discharge of the liquid through the spout 3. The initiation of the dosing cycle will now be described, with the position of the dosing piston 10 as shown. It is now time to pour out this dosing portion downwards and outwards from the dosing piston 10. For this purpose, a higher pressure must be generated in the interior of the container 22 or, in the case of a hose, in the interior of the hose, than that which prevails outside the container, the tube and the closure, i.e. a pressure higher than atmospheric pressure. This is done by the container 22 being squeezed with one hand or both hands and is thus easily squashed. In the case of a hose for the liquid feed, this may be accomplished by a hose closure being installed in the hose in its end region upstream of the dosing closure, and leading to an elastic compressible bellows, which then opens into a spout and which spout is finally equipped with the dosing device. The more strongly that the container or bellows is squeezed with the hose closure closed, then the faster is the dispensing of the dosing amount, which comprises a volume of 80 ml to 90 ml in a typical sizing of the dosing device. Of course, the dosing amount may be made larger or smaller through another sizing, to some extent by an increase or decrease in the scaling of the dosing device. The dosing chamber, not to be confused with the dosing control chamber, is the space 21 under the dosing piston 10.

Figure 8:
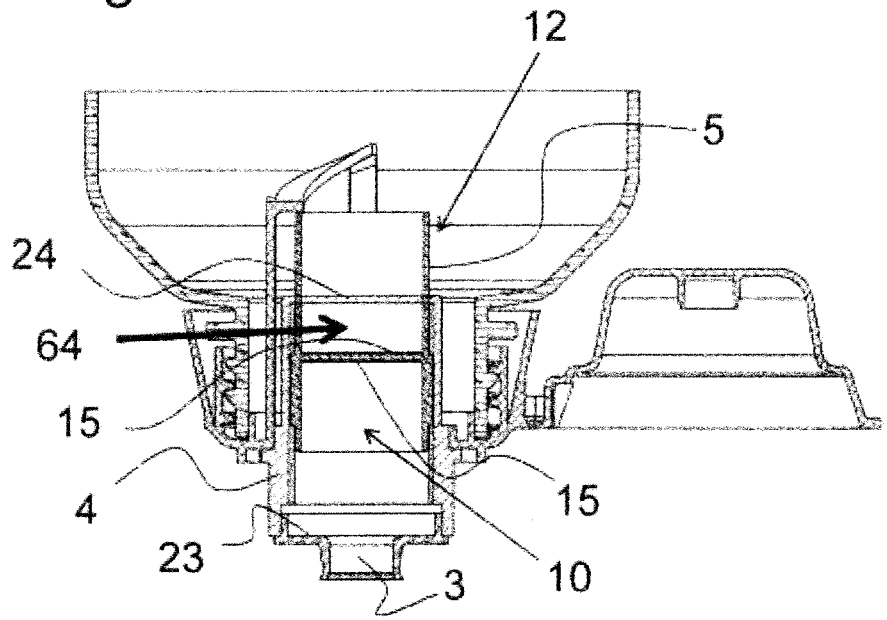
FIG. 8 shows the dosing device in an axial section, with the dosing piston on its way downwards upon the dispensing of the dosing portion.

The liquid contents of the container 22 pushes against the cover 15 from above upon the squeezing of the container or bellows. Thus, by analogy, the seat of the illustrative chair forms the dosing piston 10. There is merely atmospheric pressure, thus a lower pressure, under the cover 15. Thus, as shown in FIG. 8, the dosing piston 10 moves downwards inside the cup 4 to push the liquid dosing portion enclosed below through the spout 3 to the outside. The space above the cover 15 forms a dosing control chamber 64, which does not initially contain a volume in the state as shown in FIG. 7, but, however, wherein the volume continuously increases through the downward movement of the dosing piston 10, eventually reaching a maximum in the lowermost position of the dosing piston 10. The space of the dosing control chamber 64 is defined by four walls, namely two fixed and two sliding walls. There are, namely, two mutually-parallel side walls extending in the axial direction to the spout, one of which is displaceable with respect to the other. One wall is stationary, namely the peripheral wall of the cup 4, while the movable side wall is formed by the extension 5. There are also two further boundary walls, namely, the bottom 24 of the cup as the stationary boundary wall, and the cover 15 of the dosing piston i.e. the seat of the illustrative chair, as the displaceable boundary wall. The bottom 24 or the bottom wall is now at an angle with respect to the wall of the cup 4, while the cover 15 is at a right angle here with respect to the extension 5. The variable volume enclosed by all four walls 15, 5, 4, 24 forms the dosing control chamber 64. Upon squeezing of the container, the dosing piston is pushed down and the volume of the dosing control chamber is enlarged and simultaneously filled from above. The dosing device is again shown in FIG. 8 in an axial section, with the dosing piston 10 on its way downwards into the interior of the cup 4, upon the dispensing of the dosing portion. In the position shown, the dosing piston 8 has covered some one fifth of its way downwards. The semicircular extension 5 on the dosing piston 10 nestles within the window 12 on the inner wall of the cup 4 and closes the gap almost tightly. This pressing down of the dosing piston 10 continues strongly due to the higher pressure on its upper side than on its underside until the dosing piston 10 reaches a stop at the inner edge 23 of the spout 3.

Figure 9:
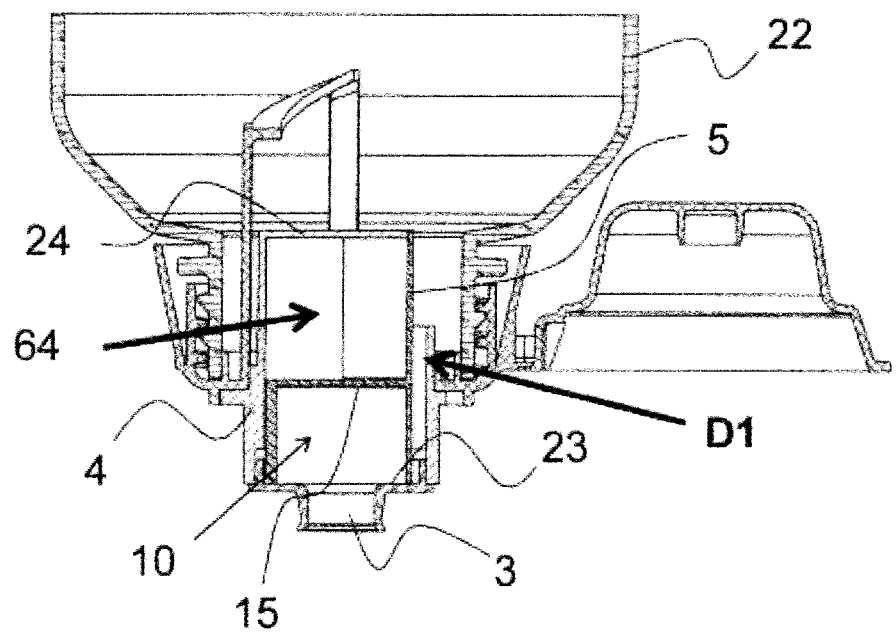
FIG. 9 shows the dosing device in an axial section, with the dosing piston in its lowest position after the dispensing of the dosing portion.

The lowest end position of the dosing piston 10 is shown in FIG. 9 This shows the dosing device and the dosing closure in an axial section, with the dosing piston 10 in its lowest position following the dispensing of the dosing portion. Until shortly before this position is reached, the liquid also flows out of the container behind the extension 5, i.e. by analogy behind the illustrative chair, from the container through the space behind it downwards. The important distance here between the rear side of the extension 5, or the illustrative chair, and the inner wall of the hollow cylindrical cup 4 is designated here by D1. In the position shown, the closure is sealingly closed, wherein the lower edge of the dosing piston rests sealingly on the edge 23 in the interior of the spout 3 and closes it. The dispensing is finally achieved by the filling of the dosing control chamber 64. Thus the pouring of a liquid dose occurs after it is first captured and retained in the filled dosing chamber 21, wherein the downward movement of the dosing piston 10 causes the volume in the dosing control chamber 64 to grow from empty to full. Simultaneously, the dose is dispensed through the spout 3.

Now is the time to prepare or load a new portion of the liquid from the liquid supply into the dosing chamber of the dosing piston 10 for the dosed dispensing. The container is compressed to dispense the dose, or in the event of a supply hose, the built-in bellows are squeezed, until the dosing piston 10 is pushed all the way downwards and the container sealingly closed. If, now, the container 22 or bellows are released, they returns elastically to their natural form and thus generate a negative pressure with respect to the prevailing outside atmospheric pressure. As a result, there is an excess pressure, which acts respectively on the underside of the cover 15, or by analogy with the underside of the seat of the illustrative chair, which is formed by the dosing piston 10. However, because the dosing piston 10 now sits inside the cup 4 with a little clearance, it immediately moves in the direction where there is no resistance, i.e. backwards in the pivoting direction of the illustrative chair.

Figure 10:
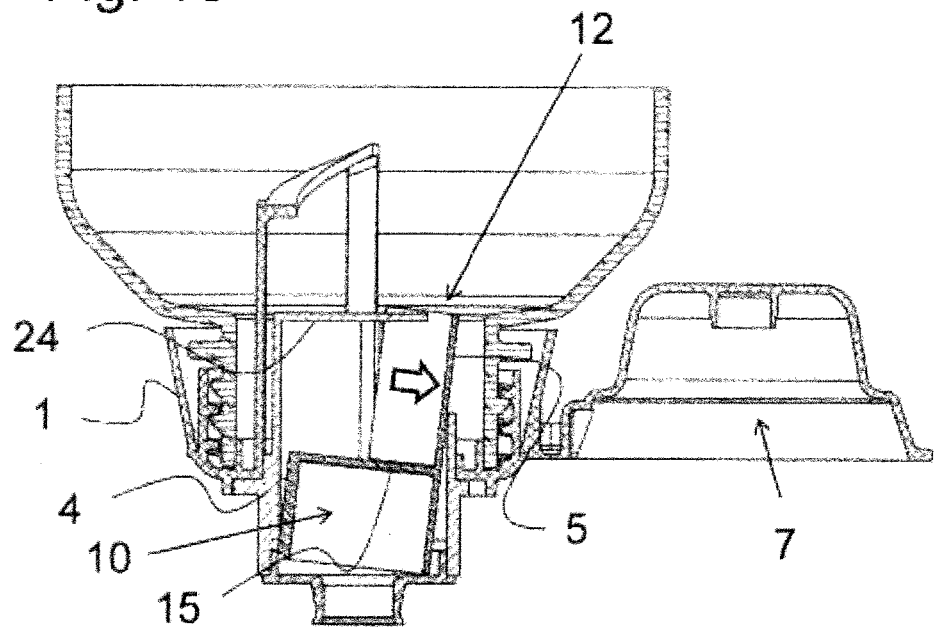
FIG. 10 shows the dosing device in an axial section, with the dosing piston in its lowest position, following depressurization of the container and subsequently the dosing piston pivoted in the cup due to the atmospheric pressure.

Thus the extension 5 tilts slightly outwards as shown by the arrow in FIG. 10. This movement or lateral inclination of the dosing piston 10 causes it to interact with the cup 4 as a closure. Thus, it not only comprises the pure function of a piston to vary the dosing control chamber volume, but also comprises a closure function. Thanks to the gap resulting from the deliberately chosen clearance and its broadening due to the inclination of the dosing piston 10 in the hollow cylindrical cup 4, air may flow from below through this gap up into the interior of the container 22 or bellows and aerate it. The same volume of liquid flows downwards into the dosing chamber from the container 22, or from its elastic bellows in the case of a hose, through the gaps between the cup 4 and dosing piston 10. This initial position for filling the dosing chamber is shown in FIG. 10. It shows the dosing closure in an axial section with the dosing piston 10 in its lowest position, after depressurizing the container 22 and, consequently, with the dosing piston 10 pivoted inside the cup 4 due to the atmospheric pressure. However, in the event of a persistent and prevailing pressure difference, the dosing piston 10 now moves upwards from this position in the hollow cylindrical cup 4 because the atmospheric pressure prevailing in its interior and thus above the cover 15 is greater than the pressure below its cover 15 resulting from the elastic recovery of the container 22 or bellows. The upwards movement of the dosing piston 10 begins until its cover surface 15 butts inside against the bottom 24 of the hollow cylindrical cup 4. Its extension 5 is displaced in this way upwards and through the window 12 of the cup 4, and now projects above the cup 4 into the container, or in the case of a hose, it projects into the hose spout.

Figure 11:
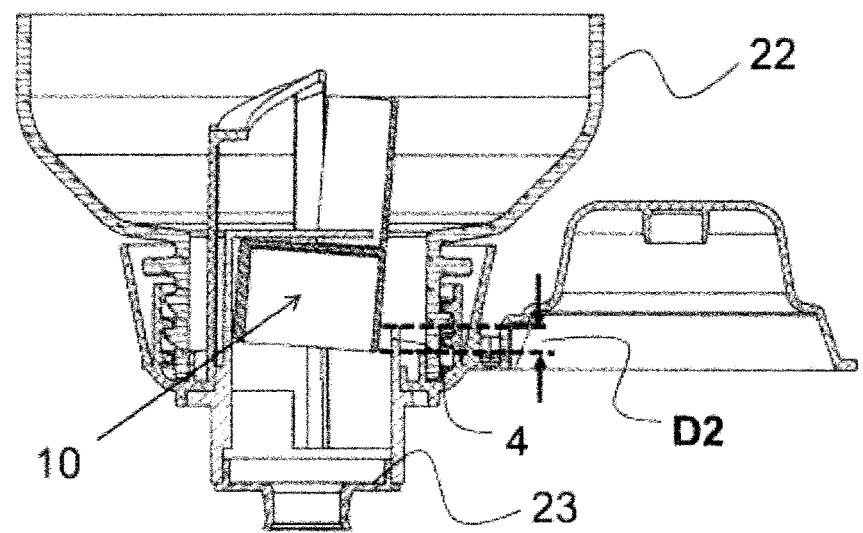
FIG. 11 shows the dosing device in an axial section, with the dosing piston in its uppermost position, after venting of the container and reduction of the pivoting due to the geometric design of the parts.

The finally occupied end position is shown in FIG. 11. It shows the dosing device or the dosing closure in an axial section, with the dosing piston 10 in its uppermost position, after aerating the container 22 or hose bellows whose inclination relative to the axis of the container is continuously reduced in the course of the upward movement of the dosing piston 10. The inclination of the dosing piston 10 is smaller in this end position compared to the initial inclination. In the end position shown here, there is an overlap by a certain distance in height of the lower edge of the dosing piston 10 on the side of its extension 5 with the upper edge of the hollow cylindrical cup 3, which is designated here in FIG. 11 by D2. Thus, the inclination of the dosing piston 10 in the upper part of its path is reduced and finally limited in the end position, so that in the end position shown, the ribs 18, 17 are mounted on its outer side of the dosing piston 10, wherein they are visible in FIG. 5, and serve as guides.

Throughout the upward movement of the dosing piston 10 as a result of the aeration of the container contents, liquid from the latter may run through the gaps around the dosing piston 10 in the region under the same to fill this space. Once the outer walls of the container 22 or the bellows are again compressed, its internal pressure also again increases above atmospheric pressure. Again, the dosing piston 10 acts as a closure and closes the gaps through which the liquid could previously run from the container 22 or bellows into the dosing chamber.

It summary, then, starting from the lowest position of the dosing piston 10 and with a compressed container 22 or bellows as in FIG. 9, the dosing piston 10 is first forced into the position of FIG. 10 by swinging away due to the unloading of the container or bellows in order to thus generate a vacuum with respect to the atmosphere, and then to rise, because a higher pressure is acting on it from below than from above. During this movement, liquid runs through the resulting gaps in the dosing chamber, but is kept inside the latter due to the pressure ratio. As soon as the dosing piston 10 with its cover 15 abuts the top of the cup as shown in FIG. 11, the dosing chamber is filled to a maximum. Now the pressure in the container 22 or bellows is again built up by squeezing. This leads to the alignment of the dosing piston 10 with the axis of the cup 4, and then to the downwards movement of the dosing piston 10 and to the dispensing of the liquid portion previously trapped beneath its cover 15.

Figure 12:
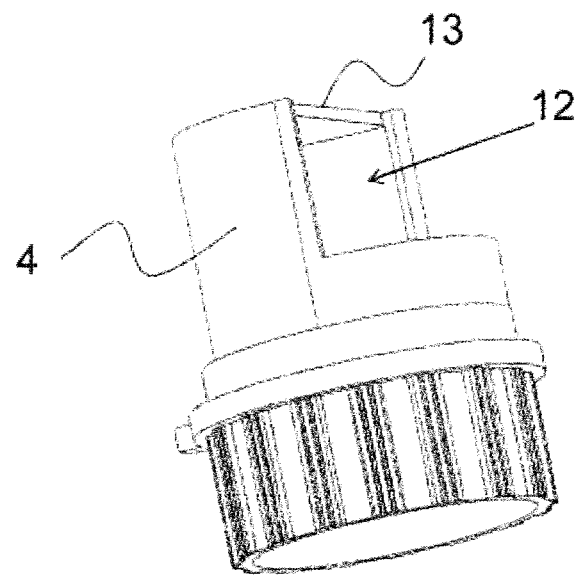
FIG. 12 shows an alternative embodiment of the first stationary part of the dosing means, namely of the cup with window.
Figure 13:
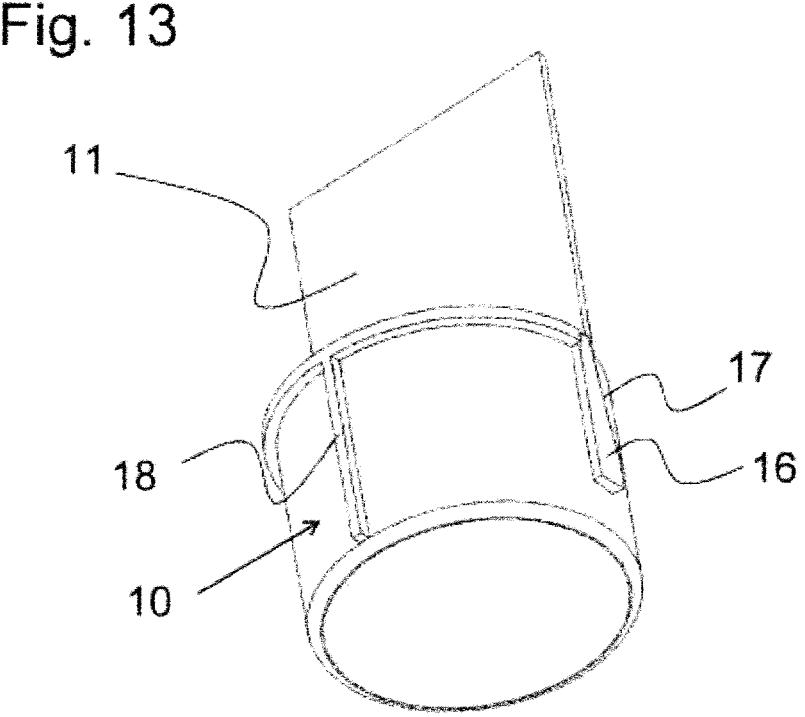
FIG. 13 shows an alternative embodiment of the second movable part of the dosing means, namely the dosing piston with a planar extension.

The previously described components may, however, be shaped and dimensioned otherwise, while each component may, if required, also comprise several parts, although one advantage of this dosing device, as well as in its design as a dosing closure, is the fact that it need only comprise these two components, namely the cup 4 and the dosing piston 10. FIG. 12 shows an alternative embodiment of the first stationary part of the dosing means, namely the cup 4 with a window 12. The window 12 is formed here by a cut-away of nearly all of the lateral half of the cup 4. There remains little more than a semicircular cover 13 as the cover 13. The associated dosing device is shown in FIG. 13. This has a planar extension 11 as a special feature which thus extends approximately diametrically through the otherwise cylindrical dosing piston 10. This extension 11 thus extends as a secant through the cover 15 of the cylindrical dosing piston 10. It should be noted here that the window, like the extension, may also be configured otherwise. The main thing is that when the dosing piston is pushed upwards, the extension slides over the window and finally comes to rest above it. The remaining elements such as the fins 16, 17, 18 on the dosing piston 10 remain unchanged. If this dosing piston 10 is inserted from below into the cup 4, then its planar extension 11 finally covers the window 12 in the cup 4, almost but not completely sealing it. From this uppermost end position, the dosing piston 10 may, however, be slightly inclined about its transverse axis, so that the extension 11 from the window 12 may be slightly inclined outwards as an inclined window. Because the dosing piston 10 may thus move between an initial almost sealing end position to an inclined position, in which the gaps are open between the frame of the window 12 and the edges of the planar extension 11, this provides an actual closure function, which is important for the optimal functioning of this dosing device or this dosing closure.

The two key parts of the dosing device and the dosing closure, namely the cup 4 and the dosing piston 10, however, need not necessarily be designed cylindrically. They may function just as well if they have another cross-sectional form such as a circle, an oval or a triangle, a rectangle or a square with rounded corners, or even more arbitrary shapes, for example with a pentagonal or polygonal cross-section. It is only important that in the lowest position of the dosing piston 10 inside the cup 4, the two components form a closed closure, and form an open closure during the upward movement of the dosing piston 10 inside the cup 4, with a constantly slightly reducing free-flow cross-section until it reaches the uppermost position of the dosing piston 10, and wherein the closure closes when the dosing piston 10 is subjected to pressure from above, or a pressure acts on the upper side of the cover 15 that is higher than the atmospheric pressure acting from below. In sum, a dosing control chamber 64 is filled during pouring and the pouring is stopped when it is full.

Figure 14:
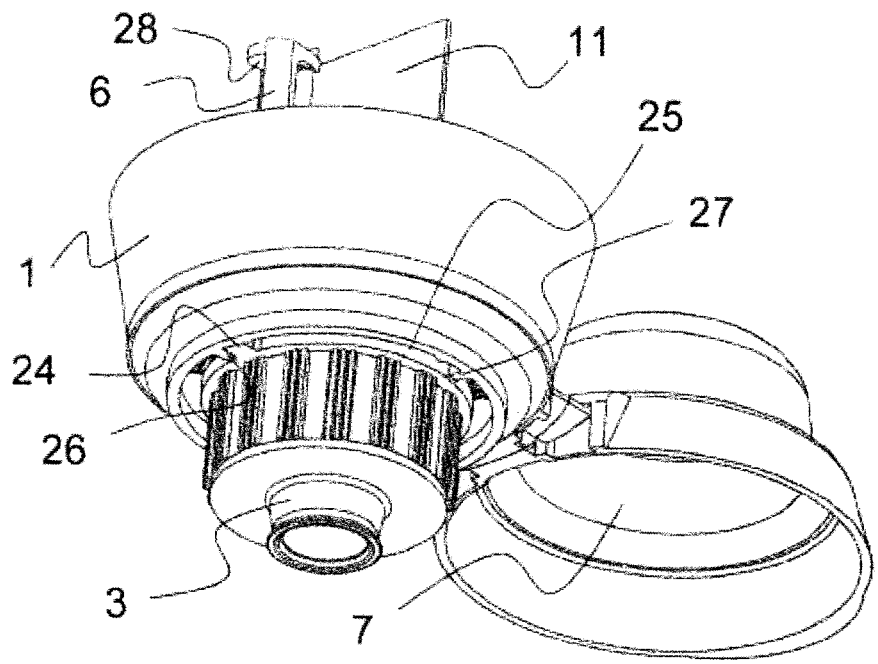
FIG. 14 shows the dosing device in the alternative design with a dosing piston with a planar extension, as viewed obliquely from below.

FIG. 14 shows a dosing device with a version of the dosing piston with a planar extension 11 as shown in FIGS. 12 and 13. The dosing device here is shown in a view obliquely from below. A helix-shaped limiter 6 extends from the top of the closure body 1 downwards, or in the opposite direction to the web 28 winding upwards, and abuts the underside of the planar extension 11 with its upper edge. In the example shown, this web 28 rises or falls helically, and is connected with the rotary body 2 as a limiter 6, which protrudes below from the closure body 1. The web 28 may, however, also have a shape deviating from a helix shape and may rather be designed to rise or fall continuously or discontinuously. The rotary body 2 may be rotated around the central axis, wherein the rotation area extends about 90° and is limited by a radially-projecting co-rotating cam 24, wherein this is rotatable back and forth between two stop cams 26, 27 on the device body 1, but no further. Upon rotation, the position of the helix-shaped web 28 changes with respect to the extension 11, so that, sooner or later as a function of the rotational position of the limiter 6, its upper edge abuts a stop at the bottom of the helix-shaped web 28. Thus, the displacement of the dosing piston 10 in the interior of the cup is adjustable, and thus the dispensed quantity is also adjustable.

Figure 15:
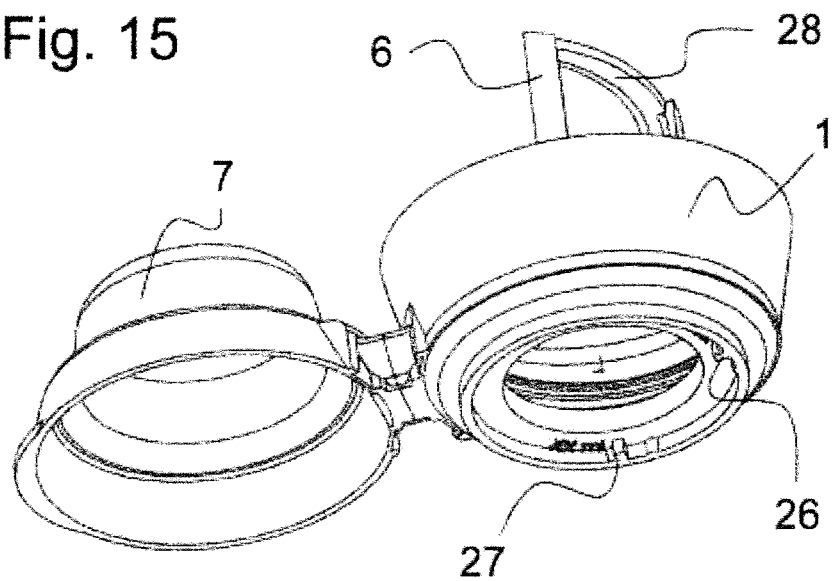
FIG. 15 shows the dosing device without inserted dosing means, in an embodiment for the step-less adjustment of the dosage amount between a minimum and a maximum.

The limiter 6 with its helix-shaped web 28 may be seen clearly in FIG. 15. In this figure, the rotary body 2 integrally connected to the limiter 6 is omitted. But the two stop cams 26, 27 to limit the range of rotation of the rotary body 2 may be seen in this figure. When the limiter 6 with the rotary body 2 is rotated relative to the device body 1, then there is a stepless adjustment of the dosing amount between a minimum and a maximum.

Figure 16:
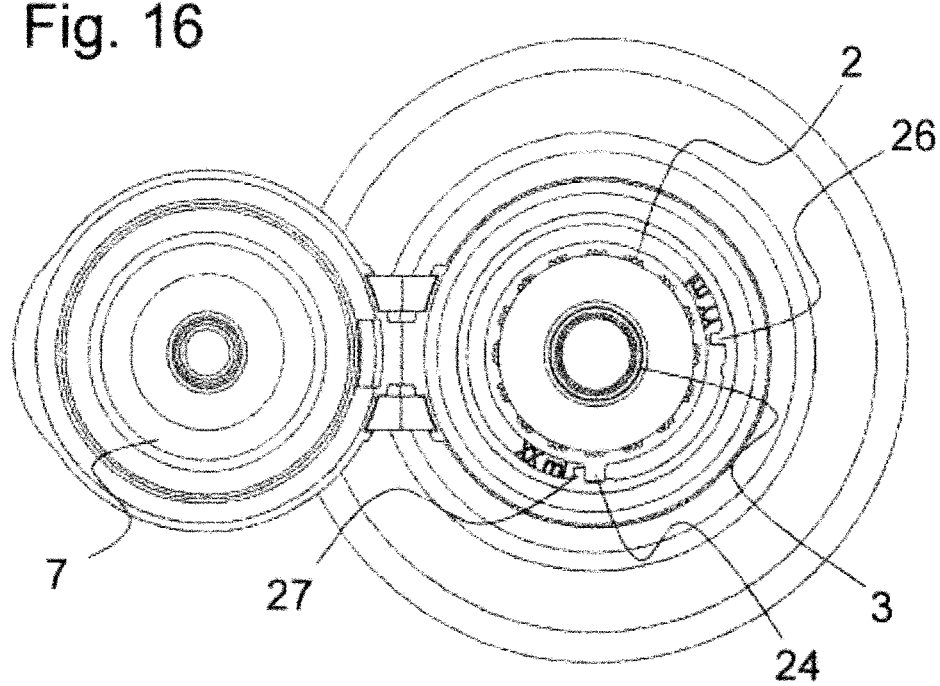
FIG. 16 shows the dosing device for infinitely-variable adjustment of the dosing amount viewed from below, with a minimum dosage setting.

FIG. 16 shows the dosing device with this continuous adjustment of dosage as seen from below, with the setting at a minimum dosing amount. The rotary body 2 is here rotated clockwise until the cam 24 strikes the stop cams 27. The limiter 6 is then in such a position that the extension 11 on the dosing piston 10 can only cover a minimal way up.

Figure 17:
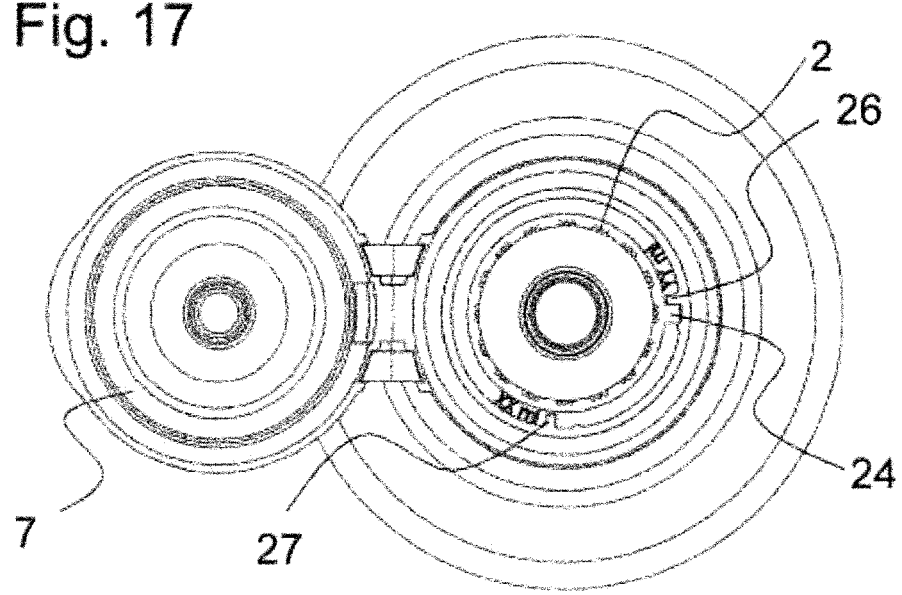
FIG. 17 shows the dosing device for infinitely-variable adjustment of the dosing amount viewed from below, with a maximum dosage setting.

On the other hand, FIG. 17 shows the dosing device for infinitely variable dosing viewed from below, with the setting at the maximum dosage. The rotary body 2 is rotated here in the counterclockwise direction in the closure body 1 until its cam 24 strikes the stop cam 26. In this case, the limiter 6 on the upper side of the dosing device is in such a position that the extension 11 on the dosing piston 10 may return a maximum extent. It is clear that all intermediate positions may be set between the two stop cams 26, 27.

Figure 18:
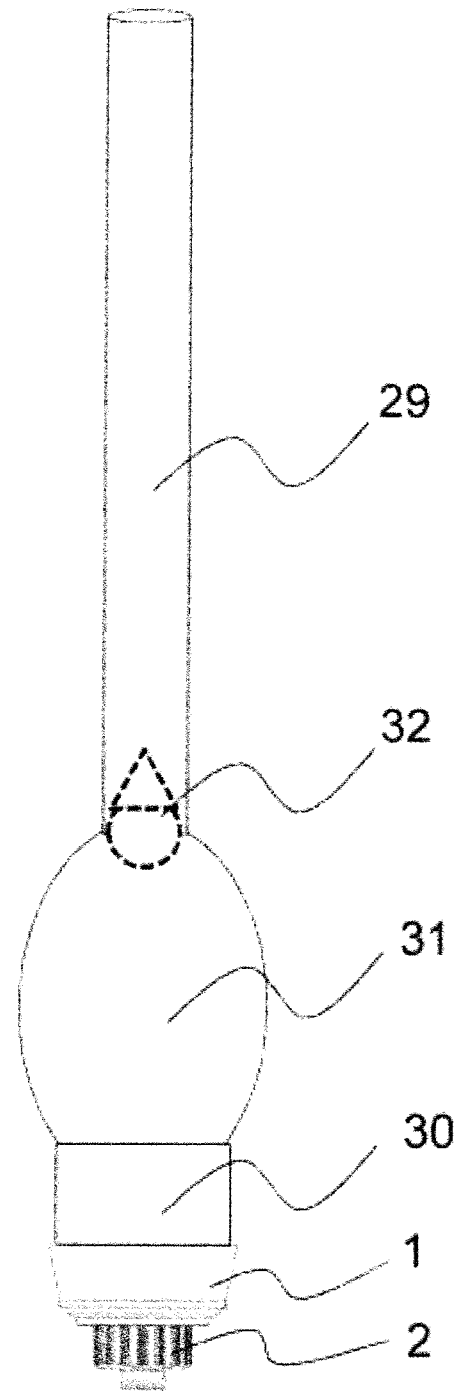
FIG. 18 shows the dosing device mounted on a hose end, which is equipped with a non-return closure, a bellows and hose spout.

FIG. 18 shows this dosing device mounted on the end of a hose 29. This hose 29 is equipped with a bellows 31 at its end, which may be supplied with liquid from the hose 29 via a hose closure 32 when this closure 32 is opened for this purpose. When in the closed state, this closure 32 ensures that upon release of the previously compressed bellows 31, no liquid flows from the hose into the bellows 31. The bellows 31 is equipped with a hose spout 30 at the front, on which the dosing device with its device body 1 and the rotary body 2 is sealingly attachable as in the case of a container spout. For the dosed dispensing of liquid, i.e. liquid portions, the hose closure 32 is closed and the bellows 31 then compressed to work in the same way as a container, wherein the liquid pressure in the interior of the dosing device is much higher than atmospheric pressure. A liquid portion is output. Afterwards, the bellows 31 is released so that it returns elastically to its initial shape. In this case, the pressure is reduced in its interior to below atmospheric pressure. Air may now flow through the dosing device into the interior of the bellows 31, wherein the dosing chamber is filled again with liquid from the bellows 31. The refilling of the bellows 31 is effected by opening the hose closure 32 when the latter is emptied.

Figure 19:
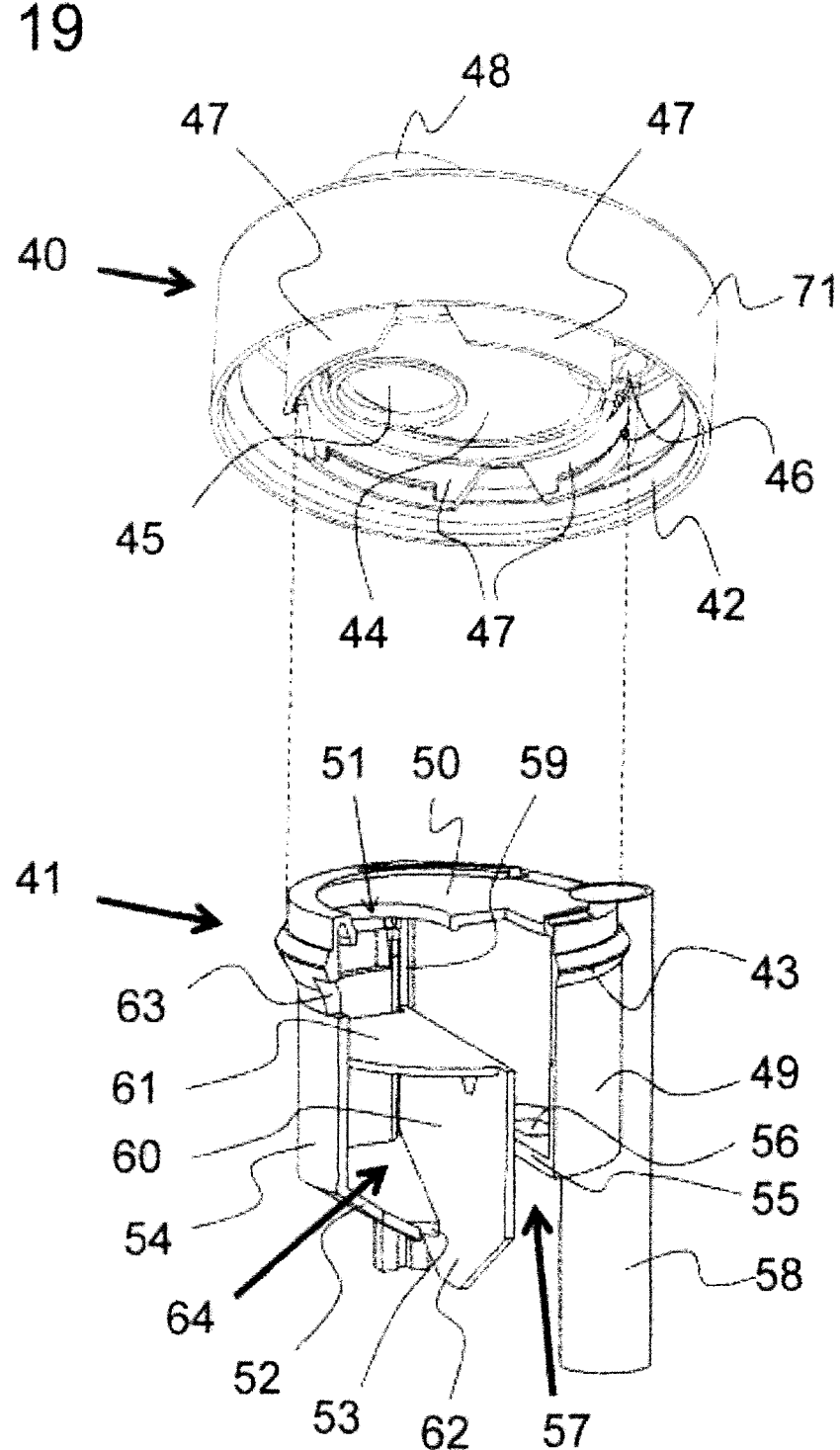
FIG. 19 shows an alternative embodiment of a dosing device with spout attachment and closure body.

FIG. 19 shows another construction of a dosing closure. But this dosing closure is based on the same inventive concept that also underlies a dosing control chamber. During the pouring, this will also be filled with a dose and when it is full, it prevents the discharge as described and explained below. FIG. 19 shows a spout attachment 40 at the top and the actual closure body 41 of the dosing closure underneath. Both parts are shown in an upright position, wherein they are placed on the upright container spout, and wherein the spout attachment 40 may easily be seen from below, while the closure body 41 may easily be seen from above. The spout attachment 40 forms a closure, in whose outer peripheral wall there is a bead on the inside, or, as in the example shown here, on which a thread 42 is formed. With this, the spout attachment 40 may be screwed on to the spout so equipped. The center of the spout attachment 40 is spanned by a disk 44 having a pouring hole 45 radially outwardly-offset from the center. At the edge of the disk 44 is a vent hole 46 with free passage from top to bottom. In order to distance the disk 44, the bottom wall segments 47 are integrally formed with projecting retaining means on its inside, for example in the form of inwardly-projecting beads. These retaining means or wall segments allows the spout attachment 40 to be put on top of the closure body 41, wherein the retaining means of the wall segments 47 may be snapped in over the bead 43, wherein the two parts manufactured as injection molded parts may be firmly connected. Right at the top of the spout attachment may be seen the beak-shaped spout 48.

The closure body substantially forms a cylinder 49 which is closed at the top by a disk 50 with a pouring hole 51. In the drawing, a piece of the cylinder wall is cut away to give a view of the interior. On the left side of the drawing, the cylinder wall 54 leads down to a bottom wall 52 running at an angle to it, similar to a funnel shape, which has an opening 53 at the bottom. The cylinder wall 54 forms a stationary side wall 54 of a dosing control chamber, while the funnel-shaped wall forms a bottom wall 52 of the dosing control chamber. The cylinder 49 on the right side of the drawing has a planar bottom wall 55 in which there is a hole 56 running perpendicular to the cylinder axis. This bottom wall 55 does not extend quite to the center of the cylinder diameter, thus leaving a gap 57 from the opposite funnel-shaped bottom wall 52. On the far right in the drawing may be seen a vent pipe 58, which is integrated in the cylinder wall, leads as far as the top of the cylinder 49, and extends downwards over the cylinder. Axially-extending grooves 59 are formed diametrically on two opposite sides of the inner wall of the cylinder 49, only one of which is visible, while the other is cut away, but which runs in the same way as the visible one. The grooves 59 extend downwards beyond the lower end of the cylinder 59. A planar side wall 60 that is axially-displaceable in the cylinder 49, is inserted in these two grooves 59 to form the displaceable side wall 60 of the dosing control chamber 64. An upper top wall 61 extends radially outwards at right angles from the top of this sidewall 60 and connects to the inside of the stationary sidewall 54. The lower end of the planar side wall 60 forms a trapezoid 62, so that in the uppermost shifted position, this side wall 60 is flush with the funnel-shaped bottom wall 52 whose inner edge covers and closes it. The axially-displaceable side wall 60 may be moved upwards until it abuts the upper top wall 61 at the disk 50. In this case, this top wall 61 closes the pouring hole 51 in the disk 50. The axially-displaceable side wall may be moved 60 downwards until the outer circular edge of the upper top wall 61 reaches the lower end of the stationary side wall 54 and is stopped by the inwardly-extending funnel-shaped bottom wall 52. In the upper end area of the stationary side wall 54, the latter has at least one window 63, which extends along the periphery of the corresponding cylinder wall. Thus all the parts of this closure body are described. The axially-extending side walls 54, 60 of the dosing control chamber 64, however, may have quite different forms, and need not necessarily form a cylinder wall or a planar wall. The only requirement is that one wall is displaceable in the axial direction relative to the other, while the top wall 61 of the displaceable side wall 60 is flush with the other stationary side wall 54, and when below, the bottom wall 52 at the stationary wall 54 closes with the displaceable side wall 60 at least until the opening 53.

The function of this dosing closure when the spout attachment 40 is mounted on the closure body 41 is explained with reference to the following figures, in which the closure body of the dosing closure is shown in the oblique-angled pouring position. FIG. 20 shows this in a first state, wherein it is located at the start of the pouring of a dose. The dose is determined by the maximum content of the dosing control chamber 64 as will immediately become clear in the following. In the drawing, the movable side wall 60 is positioned at the bottom of the closure body or in the drawing on the far right. The top wall 61 butts against the funnel-shaped bottom wall 52. The liquid flows out of this starting position of the dosing process from right below the displaceable side wall 60 through the opening 53 into the dosing control chamber 64, which is formed here by the stationary side wall 54, the funnel-shaped bottom wall 52, the slidable top wall 61, and the displaceable side wall 60. In the leftmost area of the stationary side wall 54, i.e. in the upper closure body, may be seen part of the window 63 in the cylinder wall of the stationary side wall 54. The liquid now pushes the top wall 61 to the left or upwards in the drawing in the closure body under the effect of the pressure it exerts. The volume of the dosing control chamber 64 increases linearly to the same degree, and is filled and enlarged in the course of this displacement of the movable side wall 60 with its top wall 61. At the same time, liquid flows out of the container above the displaceable side wall 60 through the gap 57 formed there, and from right to left through the hole 56, and finally through the pouring hole 51 to the outside as shown by the arrows. On the left in the drawing may be seen the top disk 50 with its pouring hole 51 closing the closure body. Contrary to the inflow of liquid into the dosing control chamber 64, air flows from left to right in the drawing from the outside through the ventilation tube 58 into the container FIG. 21 shows the dosage closure or its closure body, which is actually inserted into the spout of a container and is surrounded by this, in the same pivotal position in a section along the cylinder axis. The four boundary surfaces forming the variable-volume dosing control chamber 64, i.e. the stationary side wall 54, the bottom wall 52, the movable side wall 60 and the top wall 61. In addition, the disk 50 and the pouring hole 51 therein may be seen on the left of the drawing.

Figure 22:
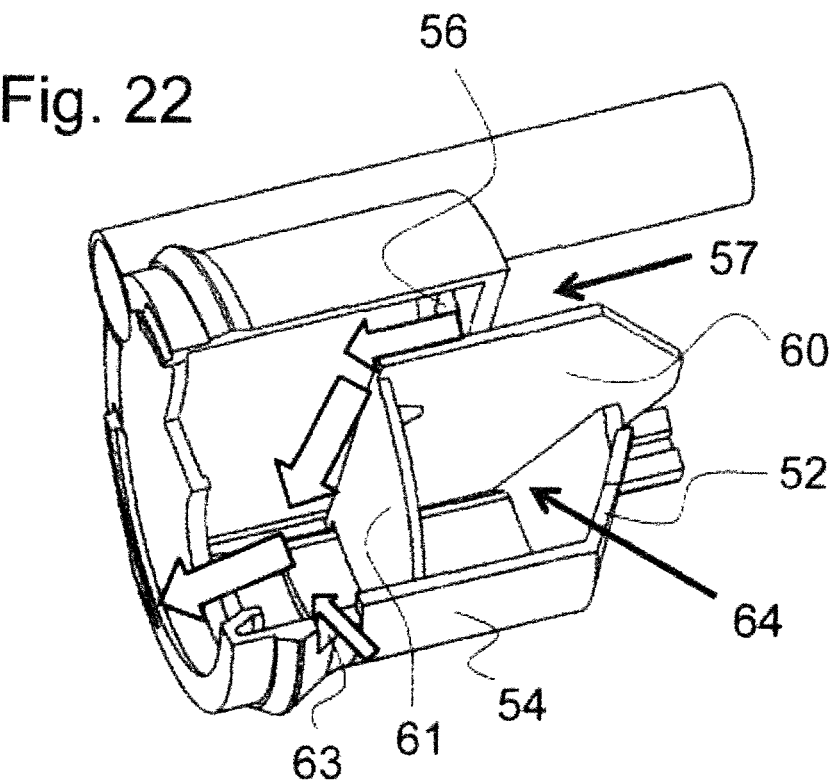
FIG. 22 shows the closure body with the dosing control chamber of the dosing device of FIG. 19 in the pouring position, shown partially cut away, with the movable boundary walls at the half-way displacement path and with the outflowing liquid indicated with arrows.
Figure 23:
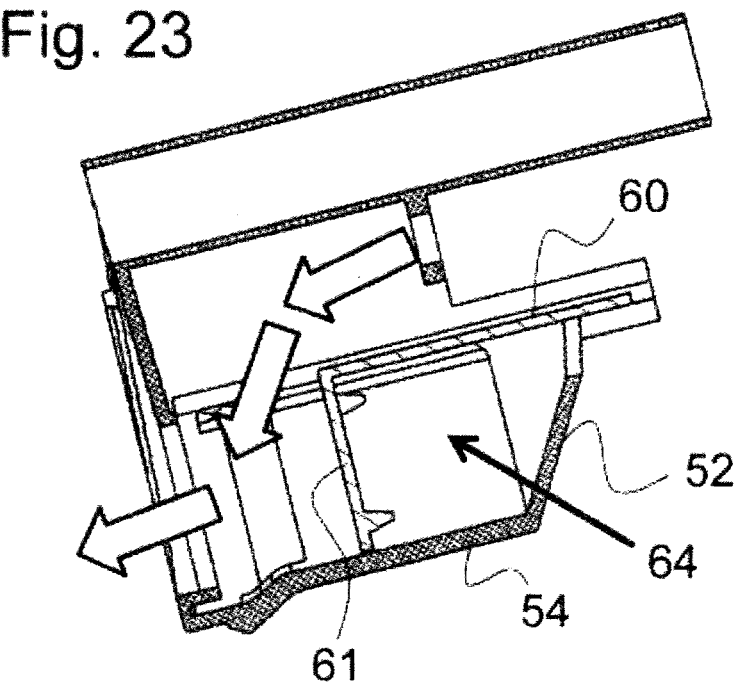
FIG. 23 shows the closure body of FIG. 22 in a section along the cylinder axis of the closure body.

FIG. 22 shows the situation in advanced filling of the dosing control chamber 64 when the bottom wall 61 has traveled approximately half its possible path with respect to the variable side wall 60, i.e. before its top wall 61 has passed over the window 63 in the stationary side wall 54 that is visible in FIG. 22. The movable side wall 60 and its upper top wall 61 are displaced far to the left in the closure body in the drawing. The dosing control chamber 64 is constantly filled with liquid and during this filling, it flows constantly over the side wall 60 into the increasing-volume dosing control chamber 64, wherein the liquid passes through the gap 57 and the hole 56 as indicated by arrows in the drawing, from the right to the left and through the pouring hole 51 to the outside. Liquid may also flow under the closure body between it and the spout of the container thus equipped with it, from right to left in the drawing, and finally flows outwards through the window 63 and the pouring hole 51. The same may be seen in FIG. 23 by means of the section along the cylinder axis of the closure body.

Figure 24:
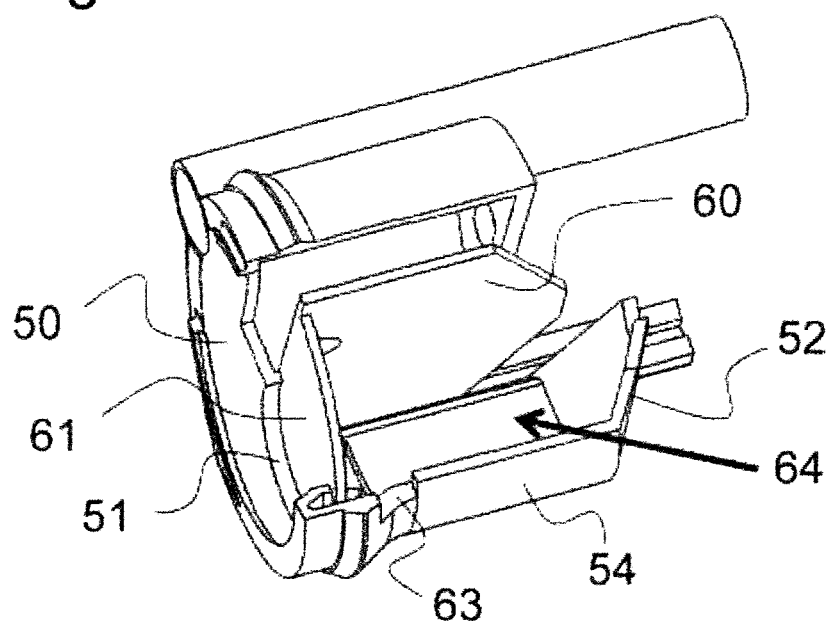
FIG. 24 shows the closure body with the dosing control chamber of the dosing device of FIG. 19 in the pouring position, shown partially cut away, with the movable boundary walls at the end of their displacement path, wherein the dispensing is stopped.
Figure 25:
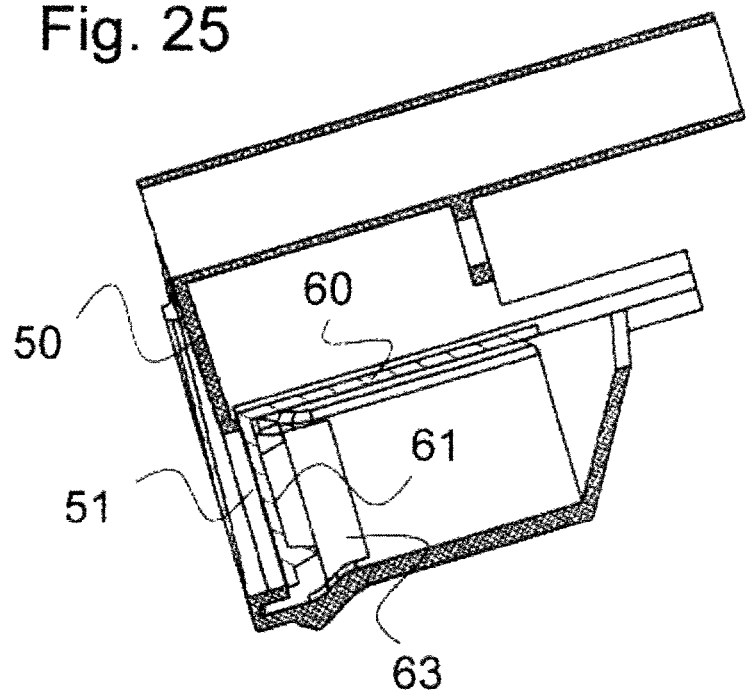
FIG. 25 shows the closure body of FIG. 25 in a section along the cylinder axis of the closure body.

FIG. 24 shows the situation when the variable side wall 60 of the dosing control chamber and its top wall 61 are displaced in the closure body a maximum to the left in the drawing. In the last section, the top wall 61 passes over the window 63. A soon as the top wall 61 has passed this window 63, liquid may also flow through this window 63 from the container between the spout and closure body into the dosing control chamber 64, and thus accelerate the movement of the top wall 61 to the left, so that it quickly closes the pouring hole 51. FIG. 25 shows this same situation in a section along the cylinder axis. The top wall 61 lies on the disk 50 below and closes the pouring hole 51 in the disk 50. In this figure may also be seen the window 63 in the side wall 54 or cylinder wall in the region of the rear part (in the drawing) of the stationary side wall 54 following the spout hole 51.

Figure 26:
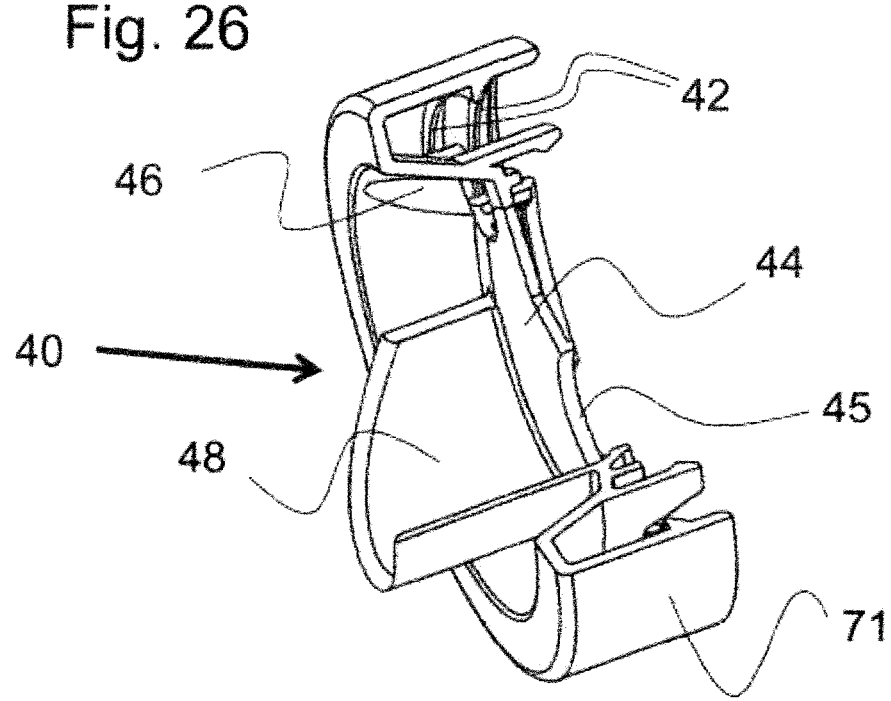
FIG. 26 shows the spout attachment presented separately, in a partial section.
Figure 27:
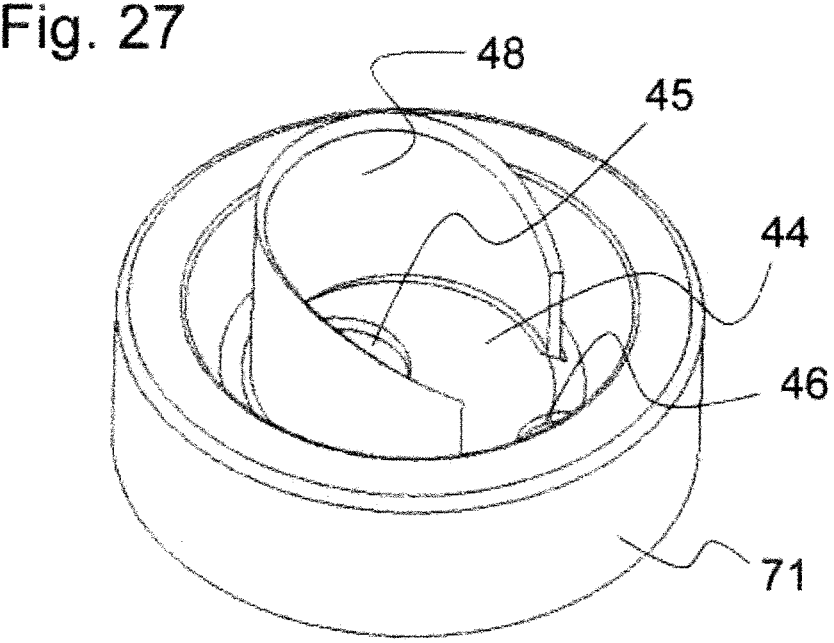
FIG. 27 shows the spout attachment as seen from above in a perspective view.

FIG. 26 shows the spout attachment 40 separately in the pouring position, with a piece cut out to show the view inside. The pouring hole 45 in the disk 44 leads into a beak-shaped spout 48 which comprises the hole 45 in its lower side. The internal thread 42 for screwing the spout attachment 40 onto a container spout may also be seen here. And FIG. 27 shows the spout attachment seen obliquely from above, with the beak-shaped spout 48, the pouring hole 45 in the disk 44, and the vent hole 46 in the edge region of the disk 44. Typically, therefore dosing is effected with this dosing closure, wherein a dosing control chamber is filled upon when pouring a dose, and when the container with the dosing closure is pivoted back to an upright position, this dosing control chamber is emptied in the reverse flow direction to the filling direction and the movable side wall 60 with its top wall 61 returns to its initial position.

FIGS. 31 to 35 show a special design of this dosing closure, respectively in a partial section to show the view inside. This allows continuous adjustment of the dosing volume or the volume of the dosing control chamber between a minimum and a maximum, and also the setting of intermediate positions, wherein the dosing closure ensures free pouring without dosing. For this purpose, the closure body is designed in three parts with its movable side and top wall. First, there is a first part A with the stationary side wall 54 and the bottom wall 52, wherein this part A may be inserted into the spout of a container equipped with it, wherein it has a projecting edge 65 at the top and a downwardly-projecting peripheral wall 66 on the periphery, which is equipped with an internal thread 67. An adjusting ring 68 is fitted on this upper end of part A, which extends downwards along its inner wall on the inside of part A, rests on the edge 65 at the top, and rests outwardly with its own peripheral wall 69 on the peripheral wall 66 of part A, which it encloses. This adjusting ring 68 may be rotated about the axis of the closure body, wherein part B, located in the interior of part A, may be moved axially upwards or downwards via a helix-shaped guide groove, wherein, however, part B cannot be twisted. There is a window 72 in the top face of the adjusting ring 68, by means of which its adjustment position is displayed with respect to the underlying part A. Part B forms the two-sided grooves 59 for guiding the movable side wall 60 and the top wall 61 as the third part C. In addition, the aeration pipe 58 is formed from part B, as well as the upper disk 50 and its pouring hole 51. This dosing closure works according to the same principle as that according to FIGS. 19 to 30. Unlike the embodiment of FIGS. 19 to 30, the size of the variable dosing control chamber may be varied by turning the adjusting ring 68 through an axial displacement of part B.

Figure 28:
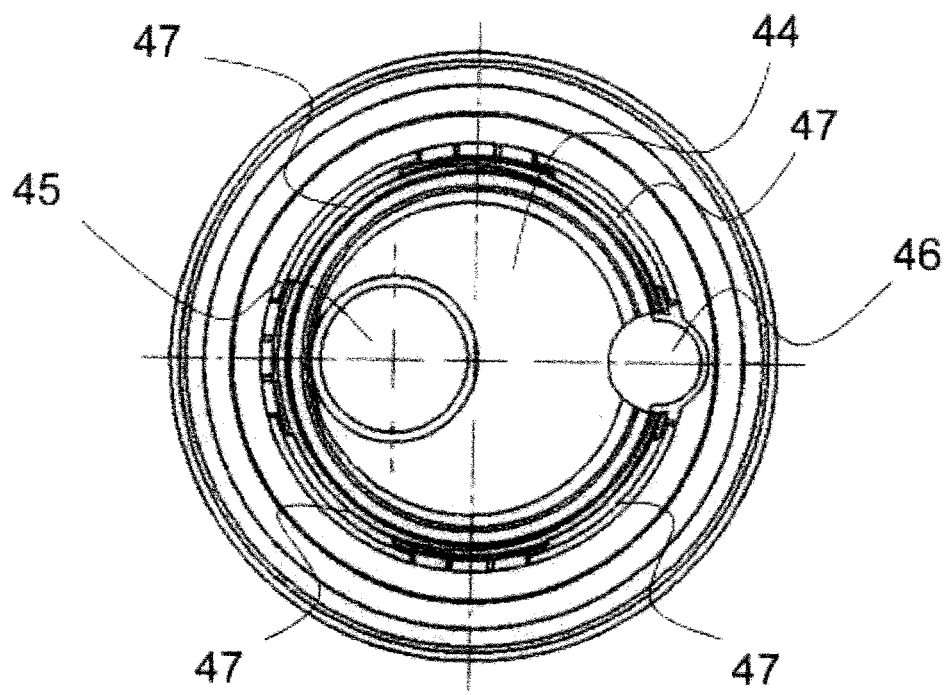
FIG. 28 shows the spout attachment seen from below.
Figure 29:
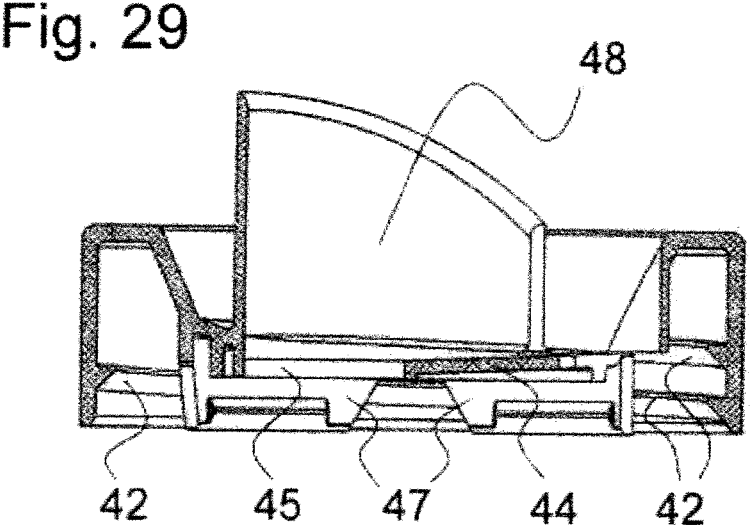
FIG. 29 shows the spout attachment side seen in a diametrical section.
Figure 30:
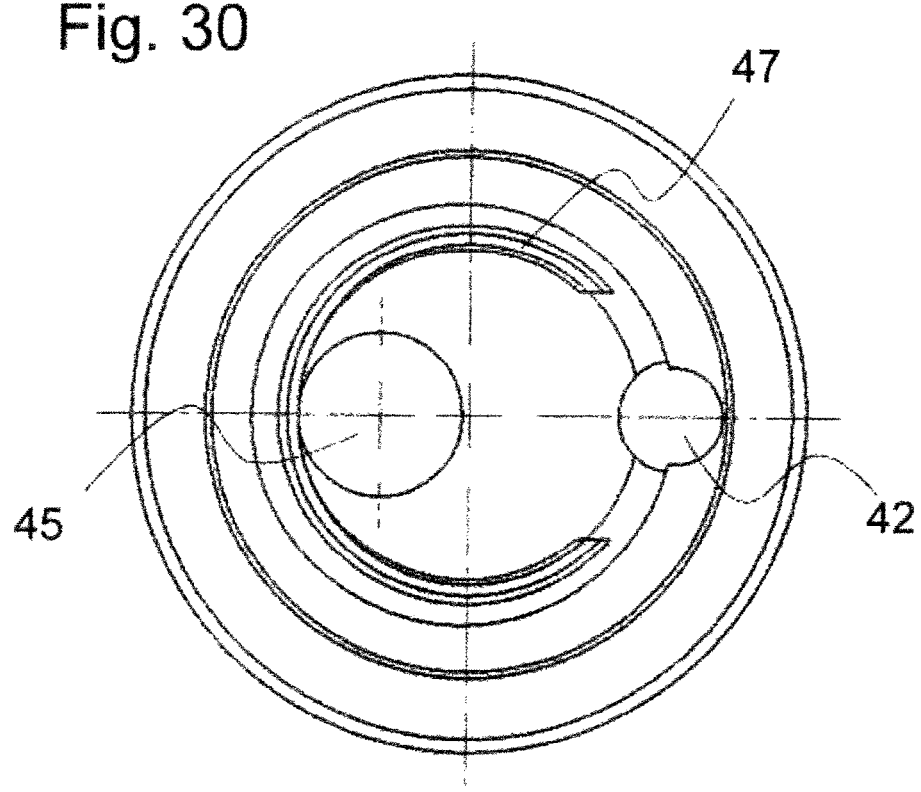
FIG. 30 shows the spout attachment seen from above.

FIG. 28 shows the spout attachment in a view from below. In addition to the disk 44 with the pouring hole 45 and vent hole 46, may be seen the wall elements 47 with their retaining means for snapping them into the spout attachment on the closure body. FIG. 29 shows the spout attachment in a diametrical section. In addition to the element already mentioned, may be seen here the thread of the internal thread 42 as well as the beak-shaped spout 48. Finally, FIG. 30 shows the spout attachment as viewed from above. The beak-shaped spout 47 may be seen around the pouring hole 45.

Figure 31:
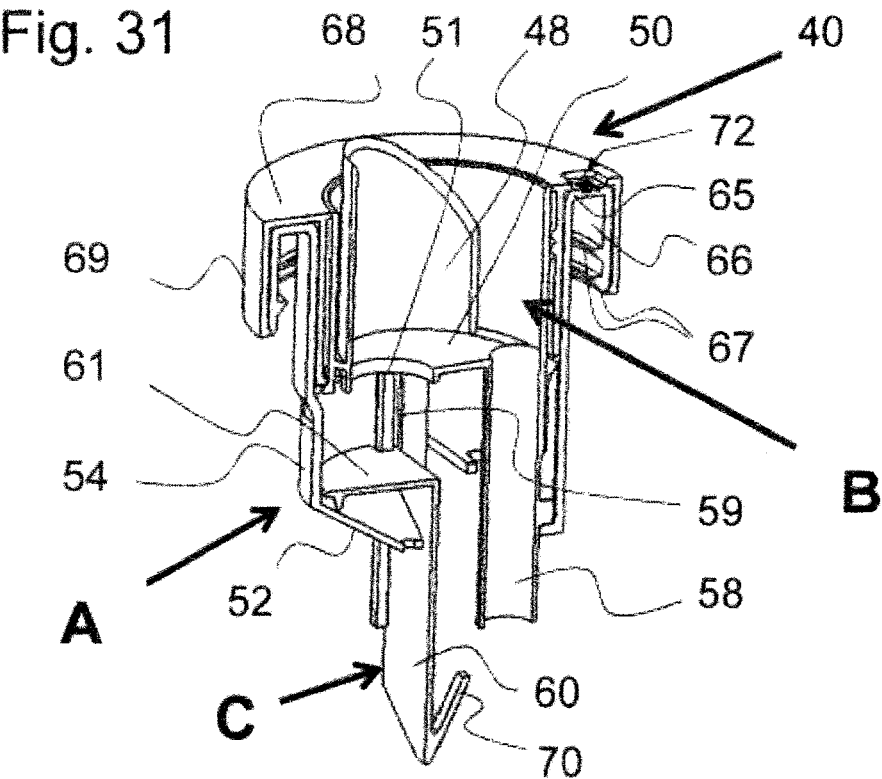
FIG. 31 shows this dosing device of FIGS. 19 to 30 in a version with adjustable dosage, represented in a partial section, for outputting a minimal dosage, at the beginning of the dispensing process.
Figure 32:
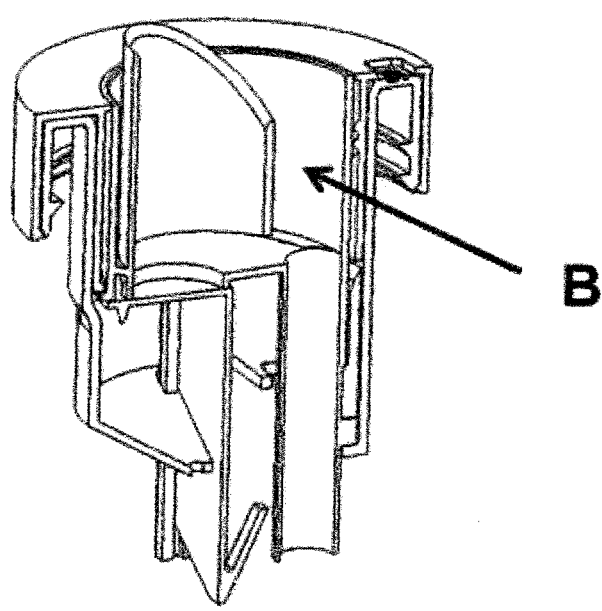
FIG. 32 shows this dosing device according to FIG. 31, at the end of the dispensing process.

FIGS. 31 to 36 show basically the same functioning dosing device, but now in a version which allows adjustment or modification of the dosing amount. To this end, the closure body is made in two parts A and B, wherein part B is displaceable relative to part A. FIGS. 31 and 32 show the situation in which the dosing closure is set for a lowest dosing amount. Part B is moved into a maximum low position in the closure body. There only remains a small displacement for the movable side wall 60 and top wall 61. FIG. 31 shows the variable sidewall 60 with its top wall 61 in the initial position, while FIG. 32 shows it in its final position to stop the pouring by covering or closing the pouring hole 51 in the disk 50.

Figure 33:
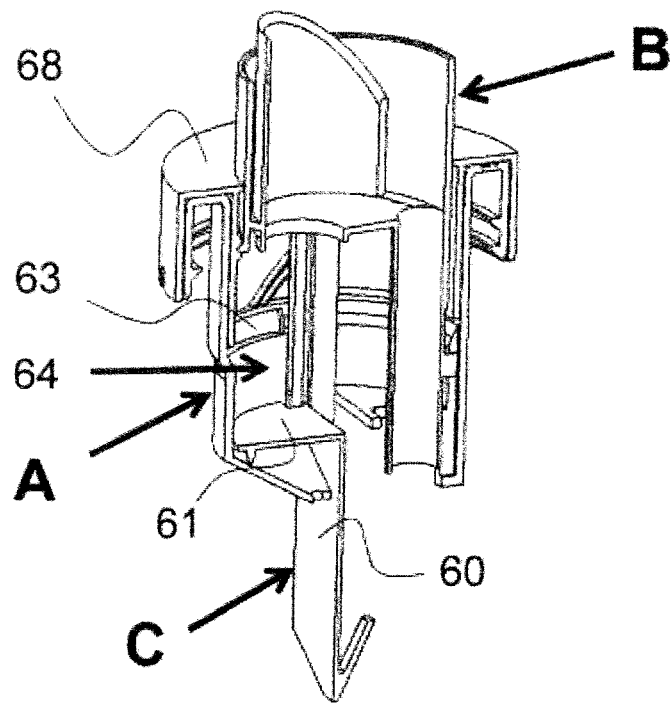
FIG. 33 shows this dosing device of FIGS. 19 to 30 in a version with adjustable dosage, represented in a partial section, for dispensing a maximum dosage, at the beginning of the dispensing process.
Figure 34:
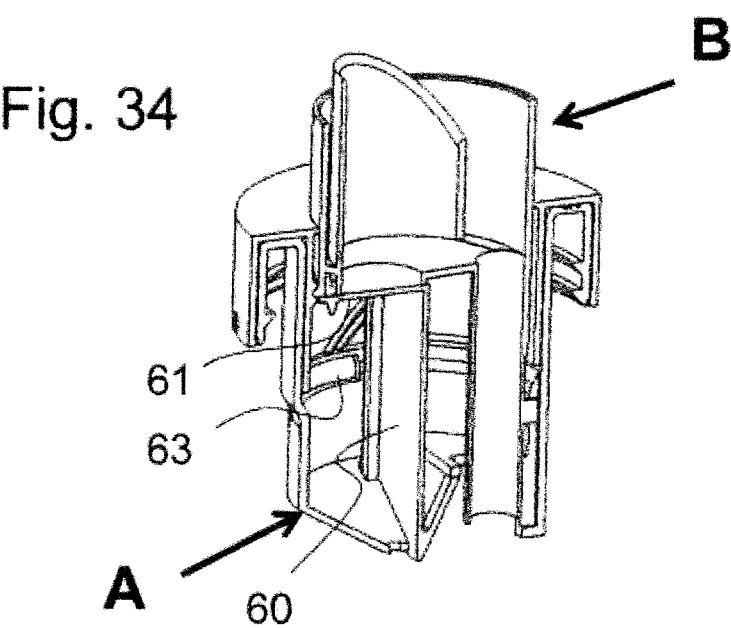
FIG. 34 shows this dosing device of FIG. 33, at the end of the dispensing process.

Part B may be further extended in the axial direction from the Part A upwards and outwards by turning the adjusting ring, in order to set a maximum dosing amount, as shown in FIGS. 33 and 34. Accordingly, the movable side wall 60 with its top wall 61 has a larger displacement path. FIG. 33 shows the dosing control chamber in the starting position. Upon pouring, it is filled and the displaceable side wall 60 with its top wall 61 moves outwards, while the top wall 61 finally overlaps the pouring hole and thus stops the pouring. FIGS. 33 and 34 also show the window 63 in the stationary wall in part A.

Figure 35:
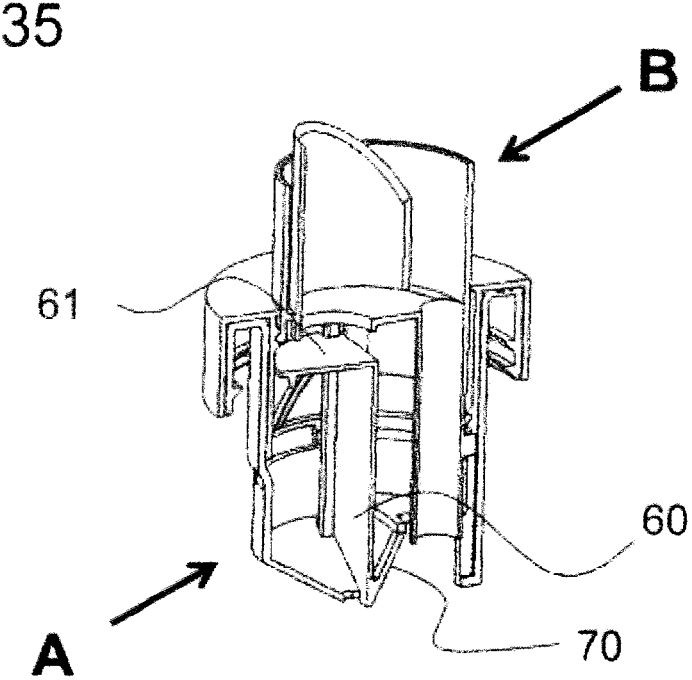
FIG. 35 shows this dosing device of FIGS. 19 to 30 in a version with adjustable dosage, represented in a partial section, for the unimpeded, continuous dispensing of liquid, at the beginning of the dispensing process.
Figure 36:
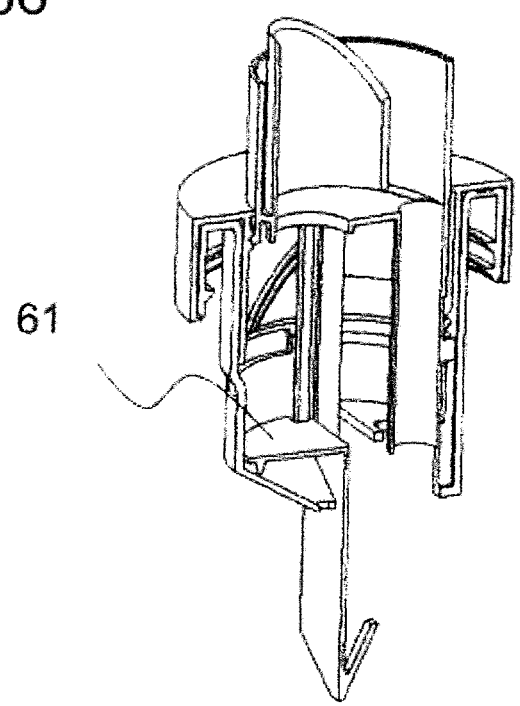
FIG. 36 shows this dosing device of FIG. 35, in the end position of the movable boundary walls of the dosing control chamber for unhindered continuous dispensing.

FIGS. 35 and 36 show the setting for an undosed continuous pouring. For this purpose, part B has been shifted even further to the outside in part A, again by turning the adjusting ring 28. FIG. 36 shows the initial position of the movable side wall 60 and the top wall 61 of the dosing control chamber. From this position, the container is pivoted into the pouring position. The movable side wall 60 and its top wall 61 are moved, driven outwards by the outflowing liquid until the variable side wall 60 and its top wall 61 reach the position shown in FIG. 35. The side wall 60 carries a projection 70 extending outwards and upwards at its lower end to serve as a stop. Namely, when part B extends sufficiently out of part A, it strikes the movable side wall 60 with this extension 70 in the extended position of part A, and prevents further movement outwards. There thus results a permanently free flow opening, because the top wall 61 stops at a distance from the pouring hole 51.

LIST OF REFERENCE NUMERALS

1 Device body
2 Rotary body
3 Spout
4 Hollow cylindrical cup
5 Extension to dosing piston
6 Helix-shaped limiter
7 Closure cap
8 Film hinge
9 Edge of device body to engage closure cap
10 Dosing piston
11 Planar projection on dosing piston
12 Window in hollow cylindrical cup
13 Cover on the cup
14 Slits in the cup cover 13
15 Cover on hollow cylindrical dosing piston 10
16 Lateral rib on the dosing piston
17 Inclined surface on the rib 16
18 Rib front of chair-shaped dosing piston
19 Hollow cylinder at the dosing piston 10
20 Lateral edges 20 in slits 14 in cover 13
21 Space 21 below the dosing piston 10
22 Container, bottle
23 Inner edge of the spout 3
24 Cams as adjustable path limiters
25 Inwardly truncated edge of cover 13
26 First stop cams on the closure body 1
27 Second stop cams on closure body 1
28 Helix-shaped ridge on the limiter 6
29 Hose
30 Hose spout
31 Bellows
32 Hose closure
40 Spout attachment
41 Closure body
42 Thread on spout attachment
43 Bead on the closure body
44 Disk on the spout attachment
45 Pouring hole in disk 44
46 Aeration hole in 40
47 Wall segments with retaining means
48 Beak-shaped spout
49 Cylinder of the closure body
50 Disk on the closure body
51 Pouring hole in the disk 50
52 Funnel-shaped bottom wall
53 Opening at the bottom of 52
54 Cylinder wall/stationary side wall of the dosing control chamber
55 Bottom wall on the closure body outside the dosing control chamber
56 Hole in 55
57 Gap outside the movable side wall 60

58 Aeration pipe
59 Grooves for guiding the side wall 60
60 Axially-movable side wall
61 Top wall of side wall 60
62 Trapezoid-shaped lower end of the sidewall 60
63 Window in the cylinder wall 54
64 Dosing control chamber
65 Projecting edge on Part A
66 Peripheral wall outside on the edge 65
67 Female Internal thread on the inside of the peripheral wall 66
68 Adjustment ring
69 Circumferential wall on adjustment ring
70 Extension on displaceable wall
71 Peripheral wall spout attachment 40
72 Window in adjustment ring 68 to display adjustment position

The invention claimed is:

1. A dosing device for a spout for dispensing defined doses from a container or tube, consisting of a screw-on or pushable spout attachment (40; 3) having a mouth and a pouring hole, closing body (41; 1) associated with spout attachment (40; 3), the spout attachment (40; 3) being closable with a separate cover, whereby the closing body (41; 1) comprises a variable-volume dosing control chamber (64), which during the dispensing is filled from empty to full, wherein the dosing control chamber (64) is bounded by a pair of stationary walls (54, 52; 4; 24) and a pair of movable walls (60, 61; 5, 15) the movable walls arranged orthogonal to each other and slidable with respect to the stationary walls (54, 52; 4; 24) in the axial direction towards the spout attachment (40; 3), and wherein a portion of the stationary side wall (54; 4) of the closure body (41; 1) forms a bottom wall (52; 24) at an angle to its side facing the container, which adjoins the movable side wall (60; 5), wherein the movable side wall (60; 5) forms a top wall (61; 15) extending at an angle from the side wall (60; 5) at its end which is facing the mouth of the container spout attachment (40; 3), and which top wall (61; 15) adjoins the stationary side wall (54; 4), and wherein the variable-volume surrounded by all four walls (60, 61, 54, 52; 5, 15, 4, 24), depending on the position of these movable walls, forms the dosing control chamber (64), and wherein in a position of the movable side walls (60, 61; 5, 15) extended as far as possible in the direction of the mouth of the container spout attachment (40; 3), the pouring hole (45; 3) is sealingly covered over by the top wall (61; 15).

2. The dosing device for a spout for dispensing defined doses from a container or pipe according to claim 1, characterized in that the closure body (41) is cylindrical, for inserting into the interior of a spout, while the dosing control chamber (64) is asymmetrically formed inside of closure body (41), wherein its cross-section forms a segment of a circle a right angle to the axis of cylindrical closure body (41), and wherein the circular part is formed by the stationary side wall (54) of the closure body (41) and the secant is formed by the movable side wall (60), and movable side wall (60) which includes side edges, is guided in grooves (59) extending axially to the spout on the closure body (41), and that on the side of the movable side wall (60) which is faced away from the dosing control chamber (64), the closure body (41) touches the movable side wall (60) along its edges which extend axially within the closure body (41) with the exception of at least one through-flow opening (57) and outside of the movable sidewall (60) and within the closure body (41), there is an aeration pipe (58) extending in the axial direction at least over the entire height of the closure body (41).

3. The dosing device for a spout for dispensing defined doses from a container or pipe according to claim 2, characterized in that die closure body (41) with its upper circular edge is insertable into a spout attachment (40) which has a disk (44) with a pouring hole (45), the disk (44) running continuously orthogonally to the closure body axis, which pouring hole (45) on the spout attachment (40) aligns in axial direction with the pouring hole (51) in the disk (50) on the pertaining closure body (41) after placing the spout attachment (40) onto the closure body (41) (see FIG. 19), while the disk (44) in spout attachment (40) comprises an aeration hole (46) on its periphery which is flush with the upper end of the aeration pipe (58) on the closure body (41), and, further, wherein a beak-shaped spout (48) is formed on the outside of the disk (44) of the spout attachment (40).

4. The dosing device for a spout for dispensing defined doses from a container or pipe according to claim 1, characterized in that the closure body (41) on the side of the dosing control chamber comprises at least one window (63) in the upper edge region along the periphery, which is intended for the sudden filling of the dosing control chamber (64) in the final phase of the filling during the pouring, so that the top wall (61) of the dosing control chamber (64) closes the pouring hole (51) in the disk (50).

5. The dosing device for a spout for dispensing defined doses from a container or pipe according to claim 1, characterized in that the closure body (41) at is upper side comprises a circular edge with the exception of the mouth at the mouth of the aeration pipe (58), which circular edge may be inserted into a corresponding circular groove on the underside of the spout attachment (40), and may be snapped into the circular groove at the molded wall segments (47) with retaining means, wherein a cap is formed radially outside the disk (44), whose peripheral circumferential wall (71) is equipped with an internal thread (42) or a bead on its inner side, to allow it to be screwed or pushed onto a spout of a container or pipe.

6. The dosing device for a spout for dispensing defined doses from a container or pipe according to claim 1, characterized in that the closure body (41) is composed of three parts (A, B and C), namely a first part (A) forms the stationary side wall (54) and the bottom wall (52), wherein this part (A) may be inserted in the spout of a container to be equipped with it, wherein this part (A) comprises a projecting edge (65) on its upper side and a downwardly-extending circumferential wall (66) on the periphery which is equipped with an internal thread (67), and with an adjusting ring (68) attached at the upper end of this first part (A), which extends longitudinally downwards on the edge (65) on the inner wall inside the first part (A), and which rests on the outside with its own peripheral wall (69) on the peripheral wall (66) of the first part (A) and encloses it, wherein the adjusting ring (68) is rotatable about the axis of the closure body, wherein the second part (B) is located inside the first part (A) and is displaceable upwards or downwards by means of a helix-shaped guide groove in the axial direction, wherein the second part (13) is not rotated, and wherein the stroke of the third part (C) which forms the displaceable side wall (60) with the top wall (61) may be varied and thus the dose is continuously adjustable between a minimum and a maximum.

7. The dosing device for a spout for dispensing defined doses from a container or pipe according to claim 6, characterized in that the third part (C) which forms the movable side wall, has an upwardly projecting extension (79) formed at its lower end, which reaches a stop at the uppermost adjustment position of the second part (B) in the adjusting ring (68) at the first part (A), so that the cover wall (61) of the displaceable side wall (60) forms a distance from the pouring hole (5 1) and allows continuous pouring.

8. The dosing device for a spout for dispensing defined doses from a container or pipe according to claim 6, characterized in that the cover surface of the adjusting ring (68) has a window (72) to show the view of the projecting edge (65) of the first part (A) located under the adjustment ring (68), and thus display the adjustment position relative to the underlying first part (A).

9. The dosing device for a spout for liquid supply from a container (22) or pipe (29) according to claim 6, characterized in that the window is formed on the cup (4), wherein approximately half of one side is cut away in the bottom area of the cup, and the extension (11) on the cover (15) of the dosing piston (10) is planar, and is so arranged that this window is closed when the extension (11) lies over the window.

10. The dosing device for a spout for dispensing defined doses from a container (22) or pipe (29) according to claim 1, characterized in that it comprises a closure body (1) with sealing closure means (7), wherein the dosing means consists of only two components, that is a hollow cup (4) with a bottom (24) fixed in the closure body (1), and a window (12) arranged in the side wall on the bottom side of the cup (4) to form two stationary boundary walls (4; 24) of a dosing control chamber (64), as well as a cap-shaped dosing piston (10) with a projection (5; 11) extending axially on the upper side of the cap, wherein the dosing piston (10) with extension (5; 11) fits in the cup (4) and, in this way, the extension (5; 11) covers and closes the window (12), and thus form two movable boundary walls (15; 5) of the dosing control chamber (64), wherein the dosing piston (10) is movable axially in the cup (4) and with its extension (5; 11) is pivotable to a limited extent in the direction towards the outside of the window (12), so that it forms an open closure with the cup (4) in its pivoted out position, while its lower edge overlaps the cup (4) by a distance (D2).

11. The dosing device for a spout for dispensing defined doses from a container (22) or pipe (29) according to claim 10, characterized in that the cup (4) forms a hollow cylinder, and the cap-shaped dosing piston (10) has a cylindrical shape, with an extension (5) extending on top of the cap in the axial direction to form an extension of the cylindrical wall over an angular segment of 90° to 200°.

12. The dosing device for a spout for liquid supply from a container (22) or pipe (29) according to claim 10, characterized in that the cup (4) forms a hollow cylinder, and the cap-shaped dosing piston (10) has a cylindrical shape, with a projection (11) extending axially on top of the cap as the secant over the cover (15) of the cylindrical dosing piston (10).

13. The dosing device for a spout for liquid supply from a container (22) or pipe (29) according to claim 10, characterized in that the cup (4) has a polygonal or a triangular cross-section with rounded corners, and the cap-shaped dosing piston (10) has a matching polygonal or triangular cross-section with rounded corners, with a projection (5; 11) extending axially on top of the cap.

14. The dosing device for a spout for liquid supply from a container (22) or pipe (29) according to claim 10, characterized in that the window is formed on the cup (4), wherein in the lower region of the cup, its peripheral wall is cut away on one side and the bottom (13) of the cup (4) is correspondingly reduced in radius on the outside by the wall thickness of the peripheral wall, wherein slits (14) extend to some extent by the wall thickness on either side of the bottom (13), while the extension (5) forms a half cylinder on the cover (15) of the dosing piston (10), which closes the window when the extension (5) lies over the window.

15. The dosing device for a spout for liquid supply from a container (22) or pipe (29) according to claim 10, characterized in that it comprises in the device body (1) a rotary body (2) comprising the cup (4) and the dosing piston (10), wherein the rotary body (2) comprises a limiter (6) projecting over the cup bottom in the form of a continuously or discontinuously increasing web (28), which forms a stop for the upwardly movable dosing piston (10) with its extension (11) in the cup (4), wherein the rotary body (2) is rotatable in the device or closure body (1), so that the extension (11) with its upper edge abuts different points on the underside of the web (28) as a function of the rotational position of the limiter (6), and wherein the rotary body (2) comprises a radially projecting cam (24) on its periphery which is rotatable back and forth between two opposite inwardly-projecting cams (26; 27) on the device or closure body (1), so that the range of rotation of the rotary body (2) is continuously adjustably limited between a setting for a maximum dose and a minimum dose.

16. A dosing device for a spout for dispensing defined doses from a container or tube consisting of a screw-on or pushable spout attachment (3) having a mouth and a pouring hole, a closing body (1) associated with the spout attachment (3), closing body (1) having a stationary sidewall (4) and having a cover attached thereto for closing the spout attachment (3), whereby the closing body (1) comprises a variable-volume dosing control chamber (64), which during dispensing is filled from empty to full, wherein the dosing control chamber (64) is bounded by a pair of stationary walls (24) and a pair of movable walls (15), the movable walls (15) and stationary walls (24) are arranged orthogonal to each other, and the movable walls (15) are slidable with respect to the stationary walls (24) in the axial direction towards the spout attachment (3) of the closing body (1), and wherein the stationary side wall (4) of the closing body forms an angled bottom wall facing the container, which adjoins the movable side wall (5), wherein the movable side wall (5) forms into a top wall, a portion of moveable wall (15) extending at an angle from the movable side wall (5) and which is facing the mouth of the container spout on one side, and which portion of moveable wall (15) further adjoins the stationary side wall (4), and wherein the variable-volume surrounded by all four walls (5, 15, 4, 24) forms the dosing control chamber (64), and wherein when the movable side walls (5, 15) are extended as far as possible in the direction of the mouth of the spout attachment (3), the pouring hole of spout attachment (3) is sealingly covered over by the top wall 15.

17. A dosing device for a spout for dispensing defined doses from a container or tube, consisting of a screw-on or pushable spout attachment (40) with spout (48), a pouring hole (45) and a closing body (41) associated with spout attachment (40), the spout attachment (40) being closable with a separate cover, whereby the closing body (41) comprises a variable-volume dosing control chamber (64), which during the dispensing is filled from empty to full, wherein the dosing control chamber (64) is bounded by a pair of stationary walls (54, 52) and a pair of movable walls (60, 61) the movable walls arranged orthogonal to each other and slidable with respect to the stationary walls (54, 52) in the axial direction towards the spout (48) of the closing body (41), and wherein a portion of the stationary side wall (54)

of the closure body (41) forms a bottom wall (52) at an angle to its side facing the container, which adjoins the movable side wall (60), wherein a portion of the movable side wall (60) forms a top wall (61) extending at an angle from the side wall (60) at a first end which is facing the mouth of the container spout, and which top wall (61) adjoins the stationary side wall (54) at a second end, and wherein the variable-volume surrounded by all four walls (60, 61, 54, 52) forms the dosing control chamber (64), and wherein in a position of the movable side walls (60, 61) extended as far as possible in the direction of the container spout (48), the pouring hole (45) is sealingly covered over by the top wall (61).

\* \* \* \* \*